June 25, 1963  G. A. HILL  3,095,163
IONIZED BOUNDARY LAYER FLUID PUMPING SYSTEM
Filed Oct. 13, 1959  11 Sheets-Sheet 1

INVENTOR.
GILMAN A. HILL
BY
ATTORNEYS

June 25, 1963 G. A. HILL 3,095,163
IONIZED BOUNDARY LAYER FLUID PUMPING SYSTEM
Filed Oct. 13, 1959 11 Sheets-Sheet 2
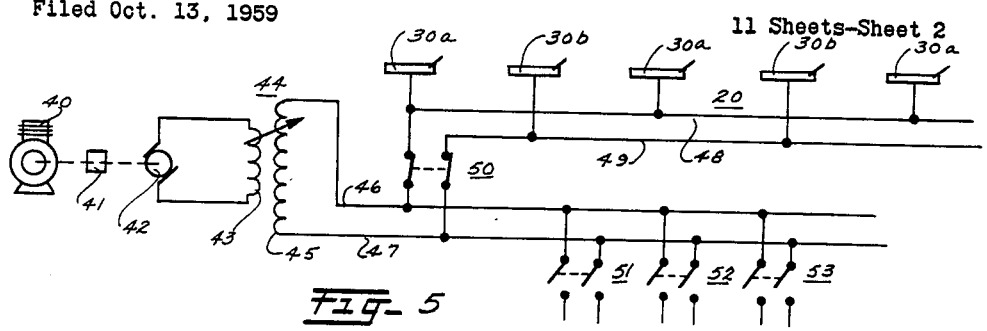
Fig. 5
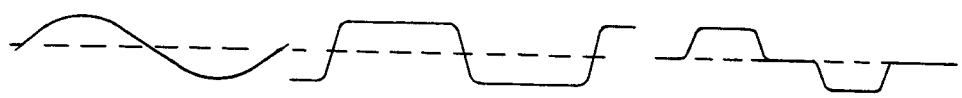
Fig. 6  Fig. 7  Fig. 8
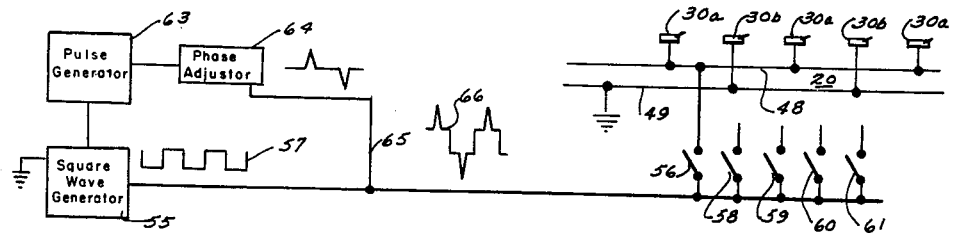
Fig. 9
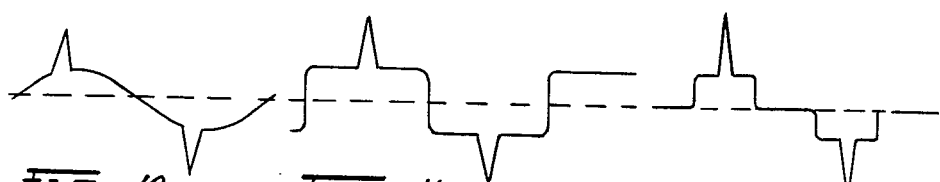
Fig. 10  Fig. 11  Fig. 12
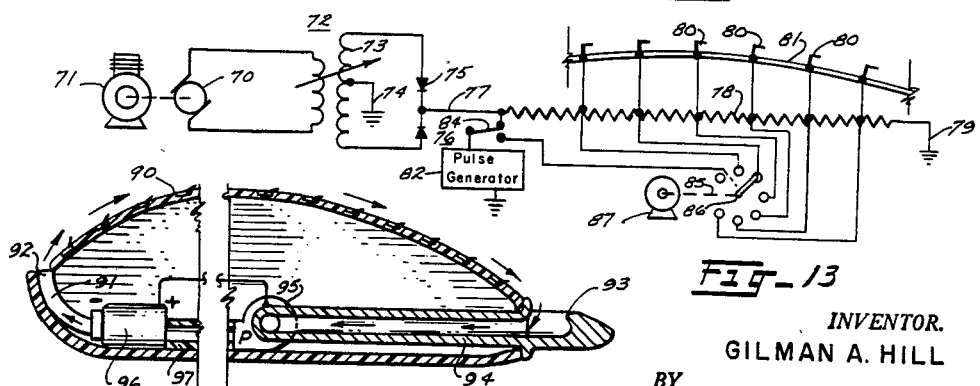
Fig. 13
Fig. 14
INVENTOR.
GILMAN A. HILL
BY
ATTORNEYS

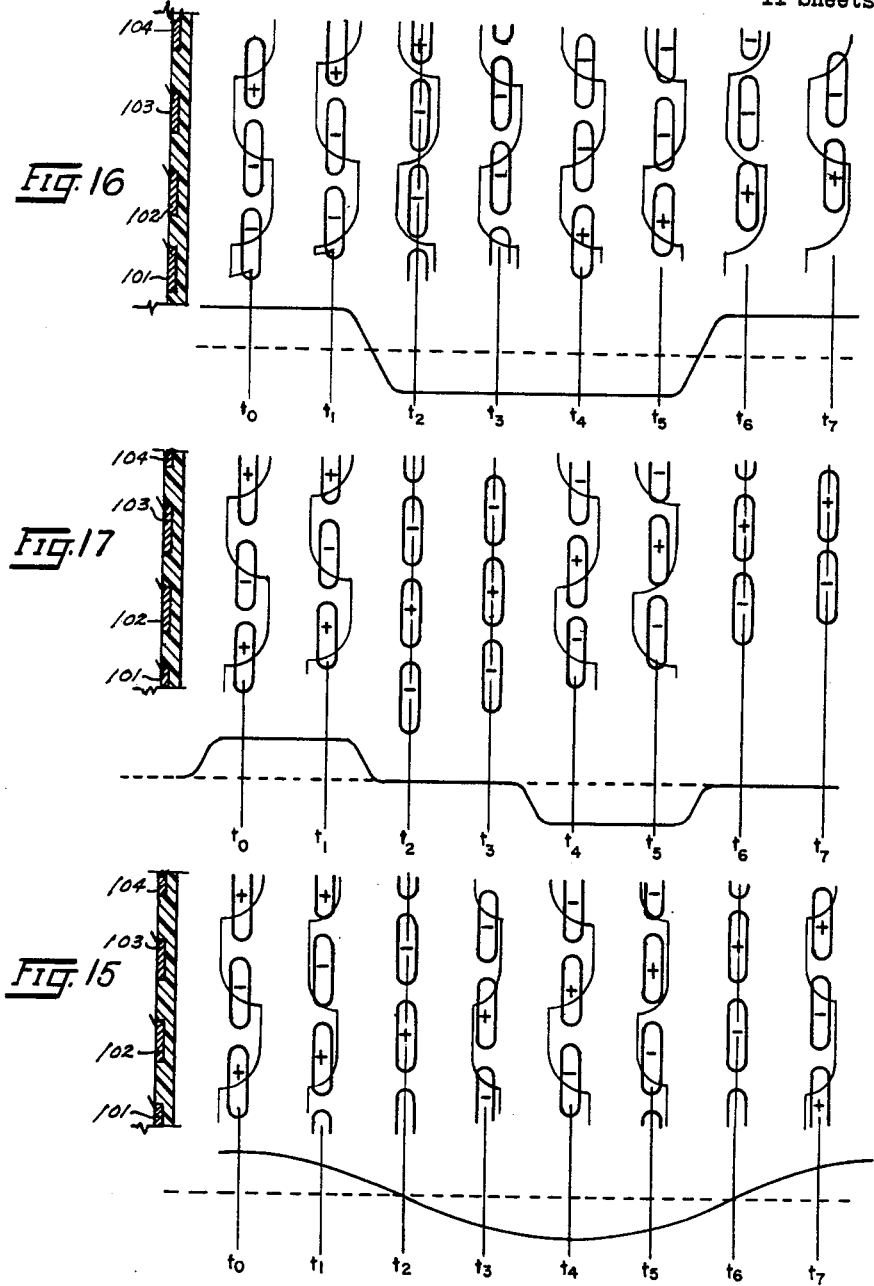

June 25, 1963  G. A. HILL  3,095,163
IONIZED BOUNDARY LAYER FLUID PUMPING SYSTEM
Filed Oct. 13, 1959  11 Sheets-Sheet 4

INVENTOR.
GILMAN A. HILL
BY
ATTORNEYS

June 25, 1963  G. A. HILL  3,095,163
IONIZED BOUNDARY LAYER FLUID PUMPING SYSTEM
Filed Oct. 13, 1959  11 Sheets-Sheet 5

INVENTOR.
GILMAN A. HILL
BY
ATTORNEYS

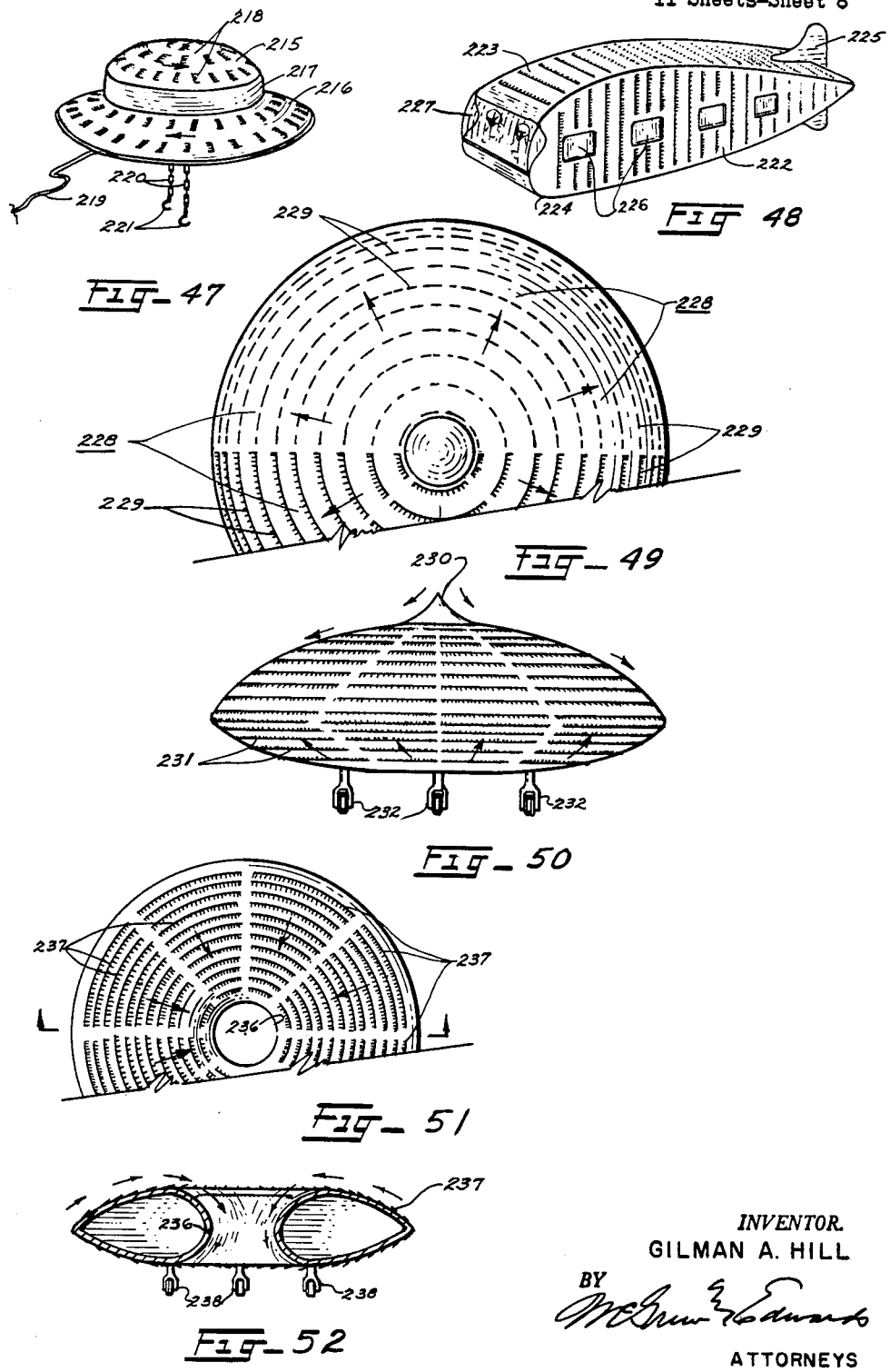

June 25, 1963  G. A. HILL  3,095,163
IONIZED BOUNDARY LAYER FLUID PUMPING SYSTEM
Filed Oct. 13, 1959  11 Sheets-Sheet 9
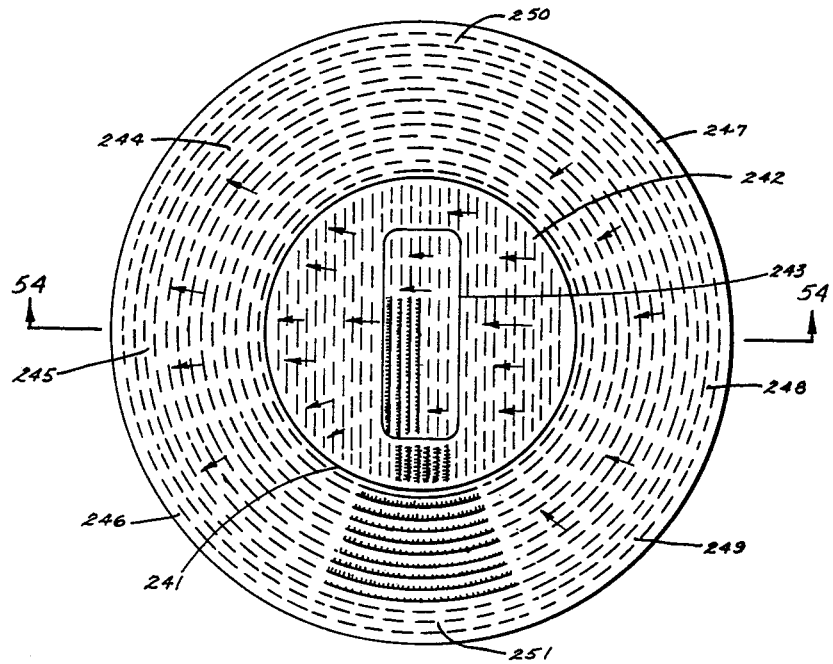
_Fig_ 53
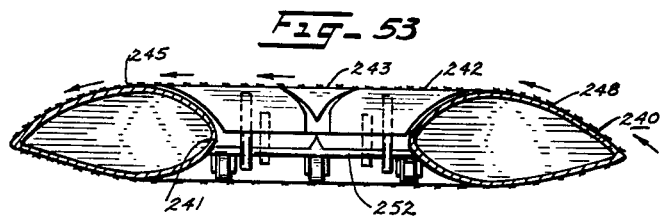
_Fig_ 54
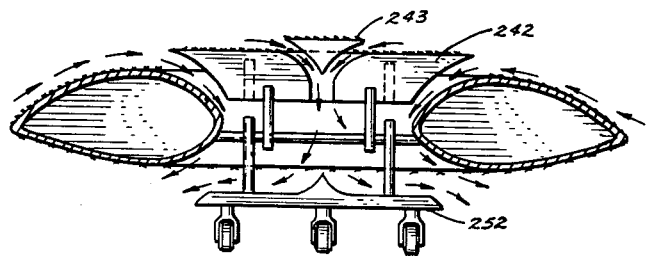
_Fig_ 55
INVENTOR.
GILMAN A. HILL
BY
ATTORNEYS

INVENTOR.
GILMAN A. HILL

June 25, 1963 G. A. HILL 3,095,163
IONIZED BOUNDARY LAYER FLUID PUMPING SYSTEM
Filed Oct. 13, 1959 11 Sheets-Sheet 11
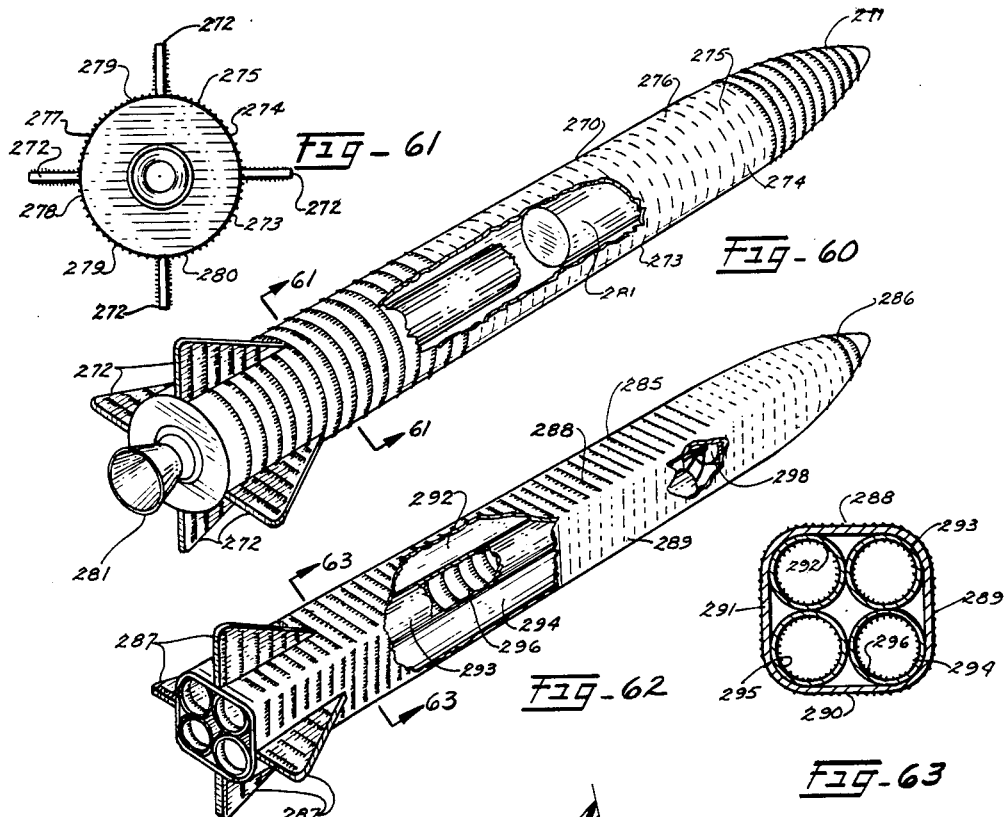
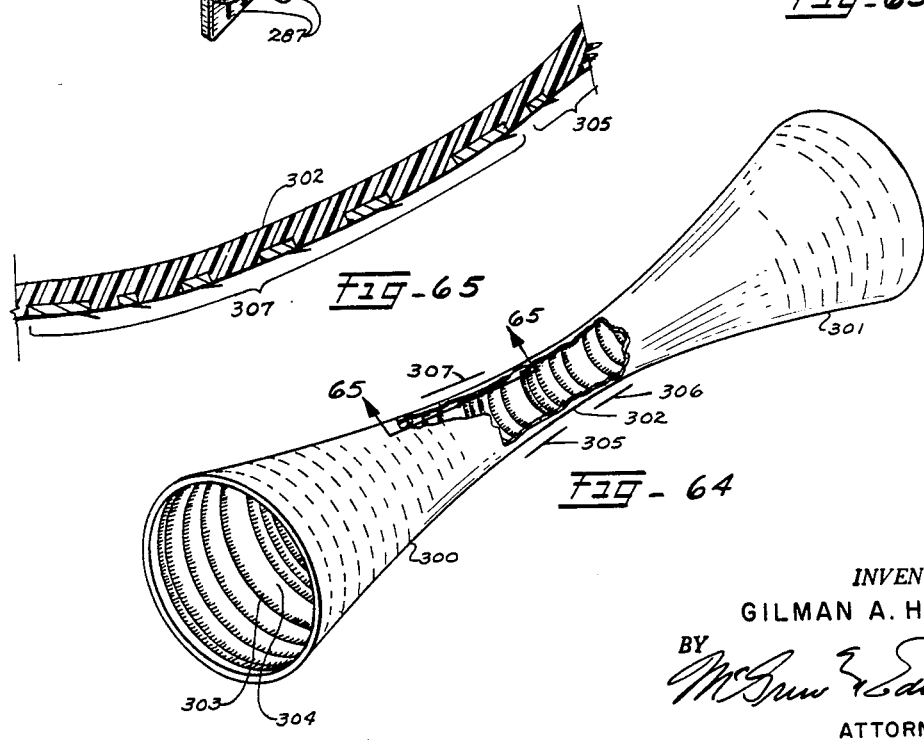
INVENTOR.
GILMAN A. HILL
BY
ATTORNEYS

3,095,163
IONIZED BOUNDARY LAYER FLUID PUMPING SYSTEM
Gilman A. Hill, Englewood, Colo., assignor to Petroleum Research Corporation, Denver, Colo., a corporation of Colorado
Filed Oct. 13, 1959, Ser. No. 846,210
16 Claims. (Cl. 244—12)

This invention relates to methods and mechanisms for moving air, water and other fluids and to the propulsion and sustentation of vehicles and other bodies in fluid media, and particularly to mechanisms having no moving parts and which are effective to move fluids at controlled velicoties, and it relates further to an improved method and system for utilizing ambient air or other fluid medium to propel a vehicle or other body and to sustain it in position in such fluid medium.

Various types of propulsion systems have been provided heretofore for the purpose of effecting high velocity movement of fluids and for driving vehicles on land, on and under water, and in the air. Among these systems are propellers such as employed on ships and aircraft and also reaction devices such as jets and rockets. All of these systems require very substantial amounts of power to overcome losses, particularly those produced by turbulence of the ambient fluid medium created by the propulsion system. This power requirement is a substantial disadvantage, particularly in the design of aircraft, a large portion of the carrying capacity of the aircraft being required for the engine or prime mover and its fuel supply. Furthermore, the maneuvering of the aircraft and submarines in use today has required rudders, elevators, and other control surfaces which react with the ambient fluid to control the movement of the vehicle by changing the direction of travel along a gradual curved path. A change of elevation is achieved by a gradual inclined climb or glide path. The guidance of rocket driven missiles and similar equipment requires the use of auxiliary rockets. Helicopters and other hovering aircraft have generally required complex rotating propeller or wing structures and have been made capable of hovering at a sacrifice of efficiency, maneuverability and speed.

It is an object of the present invention to provide a new system for propelling vehicles and other bodies through fluid media.

It is another object of this invention to provide a new sustentation system for aircraft and submarines.

It is another object of this invention to provide an improved system and method for utilizing electric fields to produce flow of fluid media.

It is another object of this invention to provide a system and method for utilizing electric fields to effect the sustentation and propulsion of vehicles or other bodies in fluid media.

It is another object of this invention to provide a new propulsion and sustentation system for vehicles operating in fluid media and which affords a higher degree of control and maneuverability than has heretofore been available.

It is another object of this invention to provide an improved propulsion system for aircraft, submarines, and the like having no external moving parts.

It is another object of this invention to provide an improved system for effecting high velocity continuous movement of streams of matter to produce reactive thrust and which may be employed as a propelling force in vehicles or other bodies.

It is another object of this invention to provide an improved power system for propelling vehicles or other objects through the atmosphere and through space.

It is another object of this invention to provide an improved vehicle capable of hovering in a fluid medium.

It is a further object of this invention to provide an improved aircraft capable of controlled movement in any direction without turning or banking or other change of orientation.

It is a further object of this invention to provide an improved system for facilitating the flow of fluids through ducts, wind tunnels and the like with minimum turbulence.

It is a further object of this invention to provide an improved propelling or force generating system for machines and power equipment for applying controlled forces in any desired direction.

Briefly, the method of producing fluid flow which is employed in carrying out the objects of this invention in the various illustrated embodiments thereof comprises the creation and utilization of an electric field so that progressively changing or different potentials are produced and so that charged particles existing or supplied near the field are propelled along the field and induce a corresponding flow of the fluid medium in which the electric field is produced. The fluid medium may be made to move in laminar or surface fluid flow so that it may be utilized to produce pressure differentials sufficient to effect sustentation and propulsion of vehicles or other bodies in the medium or in other applications, for example, to facilitate the flow of the ambient medium or other fluid through pipes, ducts, or the like in which the electric fields are produced.

In one embodiment of the invention in the aeronautical field, an aircraft of conventional airfoil design is provided with a propulsion equipment which employs charged electrodes to accelerate and drive ions or other charged particles, thereby producing a reactive thrust on the electrodes and also creating high velocity streams of air and resulting low pressures along the adjacent airfoil surfaces. These pressures, produced in accordance with Bernoulli's theorem, are sufficiently low to effect sustentation and movement of the aircraft by providing a differential pressure between the upper and lower wing surfaces of the aircraft. The airfoil surfaces are convexly curved, and the electrode elements are arranged in a plurality of parallel rows approximately perpendicular to the longitudinal axis of the aircraft, the rows of electrode elements being spaced from one another at predetermined intervals along a line or zone extending back from the leading edge along the curve of the surface. Each electrode element comprises a rod or bar having a multiplicity of individual electrode points directed along the curve toward the adjacent row in the direction of air flow. All the points are positioned to lie in substantially the same plane, generally parallel to and either spaced somewhat from the airfoil surface or mounted flush with the airfoil surface. An electric power supply system is carried by the aircraft and may include an electric generator driven by any suitable power source, for example, an internal combustion engine. Alternating current excitation of the electrodes is presently preferred although for some applications a direct current system may be employed; in either case the electrodes in successive rows are charged in such a manner as to create an electric potential gradient or electric field through which ions or other charged particles are accelerated to attain high velocities in moving over the rows of electrodes. When alternating current excitation is employed the operation of the system is analogous to that of a squirrel cage induction motor, a predetermined phase difference being maintained between the rows of electrodes, and the system being operated to propel the masses of charged particles at a resonant velocity sufficient to maintain the desired air flow velocity. When direct current is employed, each row of electrodes is at a higher potential than the preceding row in the direction of air movement, and consequently between the first and last rows a very high potential, equal to the sum of the voltages between each row, must be employed. Whichever excitation system is employed, the ions or charged particles move successively from one row to the next and create an aura or "electric wind" by dragging air along the airfoil surface. By providing a sufficiently high potential gradient at the pointed electrodes, corona discharge is obtained, thereby creating an abundance of ions and greatly facilitating the driving of the air along the airfoil surface. Substantially streamline laminar or surface layer flow of air is obtained by the system of the present invention which thus avoids much of the turbulence and attendant losses occurring in conventional aircraft propulsion systems. Forward movement of the aircraft is produced by the reactive thrust on the electrodes and by selective excitation of electrodes on forwardly facing surfaces and may be increased by producing a "nose-down" attitude of the plane. Hovering of the aircraft can be attained by a "nose-up" attitude, giving a vertical vector resultant from the vector sum of the reactive thrust on the electrodes and the force created by the Bernoulli theorem reduction of pressure on the airfoil surface.

The convexly curved surfaces of airfoils and other vehicle walls may be employed to minimize the capture and loss of charged particles by the electrodes; this is accomplished by orienting the electrodes to drive the particles around the curved walls thereby producing centrifugal forces which urge the particles away from the curved surface. These centrifugal forces are generally in the same direction as and supplement the pressure produced forces or lift.

In other embodiments of the invention the vehicle body may be in the form of upper and lower cones or may comprise upper and lower flattened dome-like portions and thus take the form of the popular conception of the "flying saucer"; and, furthermore, the vehicle may be operated under water as well as in the air. The electrode elements in these embodiments may be arranged along circular paths, in spiral paths from the center outward, or from the circumference inward, or along any other straight or curved line or other configuration. In other applications, electrodes of any configuration such as needle-pointed combs or flat plates may be mounted above, at, flush with, or just under the airfoil surface, and are insulated from any electrical conducting portion of the airfoil structure and from each other. The pointed electrodes are employed when ions are to be created by corona discharge or gaseous ionization. A very thin coat of protective insulating material may be applied to portions of the electrodes in some applications to minimize corrosion or other deterioration of the metal and to minimize ion capture.

In another embodiment a vehicle similar to those referred to above is provided with one or more elongated rearwardly open tubes or passages the inner walls of which are provided with electrodes for discharging masses of charged particles through the tubes, such particles being supplied from the vehicle near the forward end of the tube. This vehicle may be flown through the atmosphere toward outer space by excitation of the electrodes on the outer surface and then the acceleration of the charged particles through the tubes can be employed to secure a reactive thrust for propelling the vehicle in rarefied atmosphere and in space. In another embodiment a rocket, with conventional propulsion is provided with a system embodying the invention to lift it to high altitudes before the rocket power is applied to propel it into and through outer space.

The fluid flow producing system of this invention is also useful in producing flow of liquids or other fluids in ducts and may be used in one embodiment for propelling air through a wind tunnel or the like at high velocities and with a minimum of turbulence.

The features of novelty which characterize this invention are pointed out with particularity in the appended claims. The invention itself, however, both as to its organization and method of operation, together with further objects and advantages thereof, will best be understood upon reference to the following description taken in connection with the accompanying drawings in which:

FIG. 5 is a schematic diagram of an alternating current excitation system for use with the invention;

FIGS. 6, 7 and 8 are graphs illustrating three forms of alternating potential wave suitable for use in the systems of the invention;

FIG. 9 is a schematic view of another alternating current excitation system embodying the invention;

FIGS. 10, 11 and 12 are graphs illustrating wave forms similar to those of FIGS. 6, 7 and 8 respectively and resulting from operation of the system in FIG. 9;

FIG. 13 is a schematic diagram of a direct current excitation system;

FIG. 14 is an enlarged view of the wing section similar to that of FIG. 2 partly broken away and illustrating another embodiment of the invention;

FIGS. 15, 16 and 17 are diagrams illustrating the characteristics of operation of the system when applying alternating current wave forms as shown in FIGS. 6, 7 and 8 respectively;

FIGS. 33 and 34 are plan and sectional elevation views, respectively, showing the construction of one form of electrode suitable for use with the systems embodying the invention;

FIGS. 35 and 36 are plan and sectional views, respectively, of another form of electrodes suitable for operation in systems embodying the invention;

FIGS. 37 and 38 are diagrammatic views illustrating the electric fields existing during excitation of the electrodes of FIGS. 33 and 35;

FIGS. 39 and 40 are plan and sectional elevation views illustrating electrodes and switches therefor for use with reversible fluid flow systems of the invention;

FIGS. 41 and 42 are plan and sectional elevation views illustrating another type of reversible electrode;

FIGS. 43 and 44 are plan and sectional elevation views, respectively, of a reversible electrode system using electrodes illustrated in FIGS. 41 and 42;

FIGS. 45 and 46 are plan and sectional elevation views, respectively, of a still further electrode arrangement;

FIG. 47 illustrates a device embodying the invention and designed for lifting and moving objects;

FIG. 48 is a perspective view of an aircraft embodying the invention;

FIGS. 49 and 50 are a partial plan and an elevation view, respectively, of another vehicle embodying the invention;

FIGS. 51 and 52 are plan and elevation views of another embodiment of the invention;

FIGS. 53 and 54 are plan and elevation views, respectively, of another vehicle including a further embodiment of the invention;

FIG. 55 is another view through the same section as FIG. 51, and illustrating a shifted position of control elements of the vehicle;

FIG. 60 illustrates a vehicle embodying the invention which is adapted for flight through the atmosphere and in outer space;

FIG. 61 is a sectional view along the line 61—61 of FIG. 60;

FIG. 62 is a perspective view similar to FIG. 60 illustrating another embodiment of an air and space craft;

FIG. 63 is a sectional elevation view along the line 63—63 of FIG. 62;

FIG. 64 is a perspective view illustrating a wind tunnel embodying the invention; and FIG. 65 is an enlarged sectional view showing the electrodes of the tunnel of FIG. 64.

Figure 1:
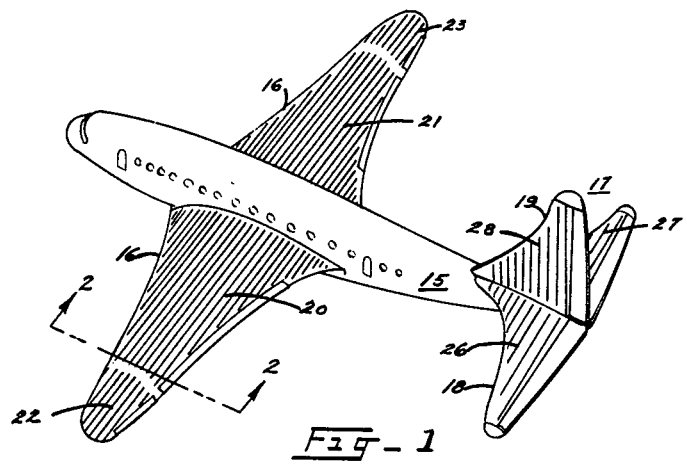
FIG. 1 is a perspective view of a conventional aircraft provided with a sustentation and propulsion system embodying the invention.

Referring now to the drawings, the aircraft illustrated in FIG. 1 is a conventional airplane except that instead of the usual propeller or jet-type propulsion system it is provided with a sustentation and propulsion system embodying the present invention. The aircraft comprises a body 15, a pair of main wings 16 and a tail assembly 17 having horizontal and vertical airfoil members 18 and 19, respectively, and including the movable elevator and rudder control surfaces of conventional aircraft.

The power plant or system includes an electric generating and excitation system for producing electric potential fields adjacent selected portions of the airfoil surfaces. The electric fields are produced in a manner such that they propel charged particles along the wing surface and create relatively high velocity flow of air in lamina or layers over these areas and thereby produce a reduction in pressure in accordance with Bernoulli's theorem, an increase in velocity being accompanied by a corresponding decrease in pressure in an amount which is proportional to the difference between the squares of the original and final velocities. The forces produced by this reduction in pressure are accompanied by two additional forces, one a reaction force produced by the acceleration of the charged particles, and the second, a centrifugal force of the charged particles traveling over curved portions of the airfoil surfaces. In the drawing there are shown on the main wings 16 two main electrode areas 20 and 21 each provided with a multiplicity of parallel rows of electrodes, and two control areas 22 and 23 each comprising similar rows of electrodes and located near the ends of the wings beyond the areas 20 and 21, respectively. The tail assembly is provided with similar areas of electrodes 26 and 27 on either or both of the stationary and movable horizontal airfoil surfaces and with additional electrode areas located on other surfaces such as on the stationary and movable vertical tail areas, as illustrated for the left-hand tail surface at 28 and on the undersides of the main wing; the underside of the tail assembly and the upper and lower surfaces of the fuselage may also be provided with sets of electrodes (not shown).

As indicated above, the sustentation and propulsion of the aircraft are secured by the electrical excitation of the electrodes in a manner to produce a high velocity flow of ions or other charged particles to induce a flow of air at high velocity over the surface of the airfoil adjacent the electrodes so that lift is produced in accordance with Bernoulli's principle. The forward propulsion of the airplane is effected by a combination of the forward reactive force produced by the rearward acceleration of the charged particles and of forward components of the lift on forwardly facing areas of the airfoil surfaces. The forward components of the lift may be increased by forward tilting of the aircraft to maintain a "nosedown" attitude. Turning of the aircraft may be accomplished by the conventional controls or by selectively adjusting the relative forces produced by excitation of the sets of control electrodes 22, 23 and 28, for example. Thus, a decrease of the relative lifting forces produced by differential excitation of one of the sets 22 and 23 over the other causes the wing to dip downwardly on the side of the set having the lesser lift.

Figure 2:
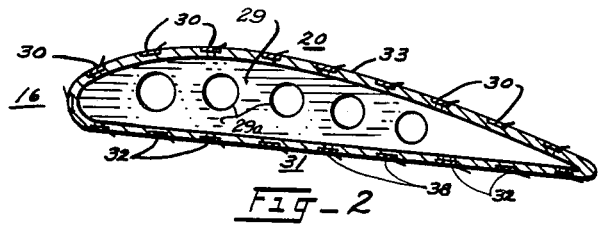
FIG. 2 is an enlarged sectional view through the line 2—2 of FIG. 1.
Figure 4:
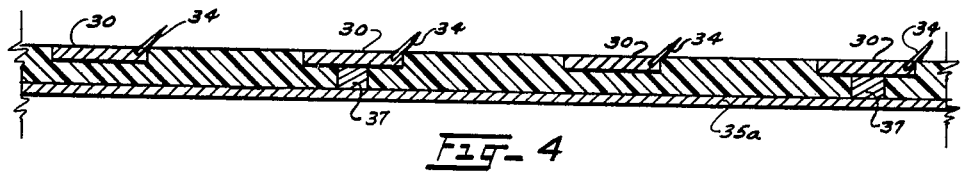
FIG. 4 is a detailed view greatly enlarged of the section of the wing of FIG. 3 along the line 4—4.
Figure 3:
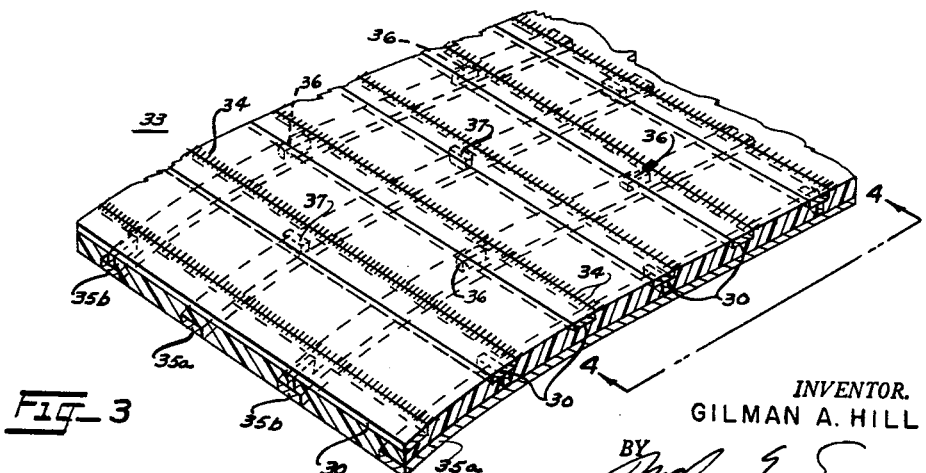
FIG. 3 is a greatly enlarged perspective view partly in section of a portion of the wing adjacent the section FIG. 2.

The arrangement of the electrodes on the airfoil surfaces is illustrated in detail in FIGS. 2, 3 and 4. The structural features of the wing section shown in FIG. 2 have been shown somewhat diagrammatically and the size of the electrodes has been exaggerated for purposes of illustration, and further the number of electrodes has been greatly reduced for the same reason. This specific wing construction has been illustrated by way of example and any other construction may be employed which provides the required strength together with the insulating surface and suitable provision for mounting the electrodes and supplying the power thereto. It will be understood from the following detailed description that the number of electrodes, their configuration, spacing, and relative positions are to be determined in accordance with the particular electrical excitation system to be employed. FIG. 2 illustrates a section through the left main wing 16 and shows the electrodes of the set or group 20, the individual electrodes being indicated at 30. The lower wing surface is provided with a similar set of electrodes 31, the individual electrodes being indicated at 32. The wing as illustrated in FIG. 2 comprises an outer wall or airfoil which has been illustrated as constructed of insulating material 33 secured on metal cross braces or ribs 29 having openings or passages 29a therethrough.

The structural features of the outer wall or skin 33 are shown in the detailed view, FIG. 3. As shown in this figure, the skin or outer wall of the wing is built up as a lattice of metal rods or bars connected at selected points where they cross to provide a rigid metallic grid which is embedded in an insulating material; the insulating material which, for example, may be a plastic provides a smooth airfoil surface. Rows or series of points project upwardly and rearwardly from each of the electrodes, as indicated at 34 in FIG. 4. The elements of the metal grid work comprise the electrodes 30 which are elongated bars extending flush with the upper surface and a plurality of cross bars designated alternately as 35a and 35b and extending across the under surface of the wall section and flush therewith. The electrodes 30 are connected alternately to the bars 35a and 35b which in turn are to be connected to different terminals of the excitation system. The connections between the electrodes 30 and the alternate bars 35a and 35b are made by cross pieces 36 and 37, respectively. The construction of the wing thus provides a durable wall while at the same time providing the electrical connections for excitation of the electrodes 30. As indicated in FIG. 3, the points 34 of the electrodes 30 are arranged in spaced rows along each electrode and all of the points are oriented in the same direction and are equally spaced from the adjacent electrode.

The construction of the lower wing surface is the same as that of the upper surface and the electrodes 32 are provided with points 38, all pointing outwardly and downwardly in essentially the same manner as the points 34 of the upper wing surface. It will thus be seen that the points of the electrodes are directed rearwardly and it is this arrangement that makes use of the reactive forces produced against the electrodes during excitation thereof and acceleration of charged particles to provide a forward thrust on the aircraft. During the operation of the aircraft the sets of electrodes on the lower surfaces may be operated for control purposes. For example, a decrease in the lifting force on the upper surface may be accompanied by an increase in the lower surface, tending to dip the wing more rapidly. The excitation of the lower surfaces may also be employed to execute a rapid descent without picking up excessive forward speeds.

The high velocity flow of air over the wing surfaces is produced by electrical excitation of the rows of electrodes. The air is driven or dragged along the wing surface normal to the rows of electrodes by ions or other charged particles which are propelled across the rows of electrodes by differences in potential between adjacent rows. The continuous flow of charged particles over the surface and the resulting surface layer flow of air minimizes turbulence and the attendant losses occurring in conventional aircraft propulsion systems. The charged particles employed in the operation of the system may be supplied or produced in various ways, and in the presently preferred embodiments of the invention are produced by ionization of the air or other fluid adjacent the airfoil surfaces by the excitation of electrodes with the voltage pulses of sufficiently high intensity to produce ionization. In this manner, clouds or masses of ions may be produced closely adjacent the series of electrodes. The high velocity flow of air is thus produced in a layer immediately adjacent the air-foil thereby reducing the skin effect as compared with that present in the operation of conventional aircraft.

The preferred excitation systems employ periodically changing electric potentials, and these systems are designated herein as alternating potential systems. The system which is illustrated in FIG. 5 is an example of the alternating potential system and comprises a prime mover such as an internal combustion engine indicated at 40 and connected through a variable speed transmission 41 to an alternating current generator 42. The frequency of the alternating current may be varied by changing the speed of the generator through operation of the control 41 which changes the relative speeds of the engine and generator shafts. The output of the generator 42 is connected to a primary winding 43 of a variable voltage transformer 44. The secondary winding of the transformer indicated as a voltage step-up winding 45 is connected to supply lines 46 and 47. These supply lines are connected to alternate rows of electrodes in the various sets or groups of electrodes and, by way of example, have been shown as connected to bus bars 48 and 49, respectively, associated with the electrodes 30 of the group 20. The individual rows of electrodes 30 in group 20 which are connected to the bus bar 48 are designated as 30a and those connected to the bus bar 49 as 30b. The additional sets of electrodes on other wing surfaces may be connected to the supply lines 46 and 47 through additional switches indicated at 51, 52 and 53. By connecting alternate rows of electrodes in this manner and electrodes 30a and 30b are maintained 180 degrees out of phase with respect to one another. Each pulse of ions or other charged particles will be repelled from the electrode that has a like charge and will be attracted toward the next electrode that has an opposite charge. At resonance each pulse of ions will flow across or pass the electrode attracting them when that electrode changes polarity, and the charged particles are further accelerated in the same flow direction by repulsion from this electrode and attraction toward the next electrode which is now of opposite polarity. If the accelerating voltage gradient between the electrodes and the frequency are properly adjusted, these pulses of ions will flow from one electrode to the next in synchronism or resonance with respect to the changing electrode potentials. This resonance may be attained by adjusting either the accelerating voltage gradient or the frequency. When resonance is achieved a minimum number of ions or charged particles will be captured by the electrodes thereby minimizing the current loss and increasing the efficiency of operation. This current loss may be further decreased by decreasing the width of the ion pulse so that more of the ions can cross the electrode while there is essentially no electric field between electrodes. The effectiveness of the alternating potential excitation including the minimizing of current losses may be controlled by the selection of the wave form of the alternating potential and also by various designs of the configuration and dimensions of the electrodes. Three different wave forms are indicated in FIGS. 6, 7 and 8. The wave form of FIG. 6 is essentially a sine wave and it will be noted that the duration of the portion of the wave when the voltage is substantially zero is very short; a pulse of this form, however, may be employed when the electrode has substantial width in the direction of fluid flow thus placing a substantial portion of the moving ions over a near zero potential gradient zone during the change-over of electric field direction. Also this sine wave form can be used without this objection and without these wide electrode configurations in some multiphase traveling wave systems. The square wave form of FIG. 7 has an advantage of maintaining higher potential for a greater portion of the cycle and makes possible the imparting of greater energy to the masses of moving charged particles. In view of the abrupt change from one square wave peak to the other, it is desirable to provide a substantial width of electrode strip over which the charged particles can coast in a near zero electric field while the field between electrodes is changing direction as in the case of the sine wave FIG. 6. In the wave form of FIG. 8 the square wave portion is followed by a substantial portion at zero potential before the reverse in polarity. This overcomes the disadvantages of the other wave forms when used in single phase excitation systems by providing a substantial period during which the electrodes are neutral giving a zero electric field and affords ready passage of the ions across the electrode without reversed propulsion on the ions arriving before or after the electric field reversal.

FIG. 9 illustrates a modified form of excitation system which is essentially similar to that of FIG. 5 but provides short duration high amplitude pulses superimposed on the alternating wave form to effect periodic higher intensity ionization of the fluid adjacent the electrodes. In this system a square wave generator 55 is connected to the line 48 through a switch 56 and impresses a square wave on the electrodes as indicated at 57. The other side of the square wave generator 55 is connected to the ground terminal as indicated and the bus bar 49 is also grounded so that the electrodes 39b are connected to the opposite side of the generator. The square wave form 57 is thus impressed between the alternate electrodes in the same manner as the alternating potential is impressed on the electrodes in the circuit of FIG. 5. Additional switches 58, 59, 60 and 61 are provided for connecting other groups of electrodes to the generating system. In order to effect ionization of the fluid adjacent the electrode, short pulses at the same frequency as the generator 55 but of greatly increased potential are impressed on each of the half cycles of the wave produced by the generator 55. In order to produce these pulses, a pulse generator 63 is connected to the generator 55 for synchronism therewith and is connected through a phase adjuster 64 and a line 65 to the switch 56 so that the ionization pulse is impressed on the electrodes with the square pulse 57. The timing of the ionization pulse with respect to the square pulse may be effected by adjusting the phase adjuster 64 so that the most desirable ionization time may be selected. Ionization is effected by corona discharge during each half cycle, the resulting composite wave form being indicated at 66 and being the wave form occurring on the supply line connecting the generator 55 and the switches after the ionization pulse has been impressed on the line through the connection 65. The high voltage or ionization pulse may be impressed on any of the wave forms indicated in FIGS. 6, 7 and 8 and the resulting wave forms are indicated in FIGS. 10, 11 and 12, respectively. The wave form of FIG. 11 is the same as that indicated at 66 in the schematic diagram FIG. 9.

A high voltage direct current excitation system is suitable for the excitation of the electrodes in some applications of the invention and an example of such generating and excitation system is illustrated schematically in FIG. 13. In this figure an alternating current generator 70 driven by an internal combustion engine 71 is connected to the primary of a transformer 72 and the secondary of the transformer, indicated at 73, is connected to supply a full wave rectifier. The center tap of the transformer is connected to ground as indicated at 74 and the two terminals are connected through rectifiers 75 and 76 to a common output line 77. Direct current thus appears at the output and the system is arranged to generate a high direct current voltage across a voltage dividing resistance 78 between the output 77 and a ground connection 79. The resistance 78 is tapped at intervals and the taps are connected to a plurality of electrodes 80 mounted in an airfoil surface 81 which may be of the same construction as that employed in the aircraft in FIG. 1. It will be apparent that if the tapping arrangement is provided with equal taps the full voltage produced by the generator will be divided equally so that the electrodes will be at progressively higher potentials in equal steps.

In the operation of this system the charged particles adjacent each of the electrodes 80 and having the opposite polarity are attracted toward the next electrode because of its higher potential, and a large proportion of the particles will similarly move past the electrodes in succession because of the steadily increased potential of the electric field. FIG. 13 also illustrates the electrodes as mounted on a convexly curved surface; with this surface configuration, as the ions are moved from one electrode toward the next they are also drawn around the curved surface and this surface introduces centrifugal force in the particles and provides a force normal to the surface and supplementing the pressure produced lift.

In order to provide an increased supply of charged particles in the system of FIG. 13, a high voltage pulse generator 82 is connected to the lead 77 to introduce periodic high voltage pulses across the voltage divider 78. These pulses are of short duration but of sufficient potential to produce corona discharge and thereby provide a supply of ions for operation of the system.

Under certain applications of the system of FIG. 13 it may be desirable to apply the ionization pulses to successive electrodes along the line of electrodes rather than impressing the ionization voltage on the first electrode in the series. In order to secure this successive application of ionization voltage, a switch 84 is provided between the generator and the voltage dividing resistance 78. When this switch is moved to its lower position it connects a rotary switch or commutator 85 to the pulse generator 82. The switch 85 includes an arm 86 which is rotated by a motor 87 and engages successively each of a series of contacts arranged about its circumference and connected respectively to successive ones of the electrodes 80, the connections as illustrated being made at the same points of the divider resistance as those to which the electrodes are connected. It will be seen that as the switch 85 is rotated in a clockwise direction it connects the electrodes one after another in succession to the pulse generator so that ionization pulses appear at successive points along the curved line and produce successive masses of ions by corona discharge along the path of fluid flow.

Under some conditions of operation of the invention it may be desirable to provide charged particles other than ions. A system arranged for this purpose is diagrammatically shown on a conventional wing airfoil in FIG. 14. The airfoil is provided with a series or group of electrodes 84 on its upper surface, these electrodes being similar to the electrodes 30 of the modification of FIG. 1. A charged particle supplying system is arranged within the airfoil or wing and comprises a charged particle gun 91 mounted adjacent the forward edge of the airfoil and having a discharge slot or outlet 92 immediately adjacent the forward or leading edge of the wing surface. The outlet 92 is arranged to discharge particles along the entire leading edge of the wing adjacent the electrode group. Any suitable fine powder or dust may be employed for this purpose. The charged particles are driven over the upper surface of the wing by excitation of the electrodes and when they reach the trailing edge pass through a slot in a metal manifold 93 provided for this purpose and are neutralized by contact with the manifold which is charged to the opposite polarity; the manifold 93 is connected to a return duct 94 through which the particles are drawn by operation of a pump 95 and are returned to a charging generator 96 through an insulating connector 97 which supplies the particles to the gun 91. The particles thus, except for losses to the atmosphere, are returned to the system for reuse.

The operation of the excitation systems as above described is essentially the same regardless of the source of the charged particles. In a system such as that illustrated in FIG. 14 the electrodes may be in the form of flat plates such as those illustrated in FIG. 4 but with the sharp points 34 omitted since these are required only for facilitating the production of ions by corona discharge in the systems employing ions.

When alternating current excitation is employed the ions or other charged particles are accelerated to successively higher velocities by increasing the voltage gradient until they reach a resonant velocity with respect to the alternating frequency. The resonant frequency is determined by the relationship $f=V/D$ where $f$ equals the frequency in cycles per second, V is the charged particle velocity in centimeters per second and D is the minimum distance in centimeters between electrodes which have electric potentials of the same phase relationship. The desired velocity V can be obtained by varying the average accelerating voltage gradient between electrodes within certain limits required to maintain the desired degree of ionization. The frequency can then be adjusted to obtain resonance with resulting charged particle velocity V and the minimum distance D between electrodes having the same phase relationship. Proper resonance can be obtained by varying either the voltage gradient within prescribed limits or the frequency. Frequencies in the range from 60 cycles per second to 10,000 cycles per second are desired for many electrode configurations and spacing but higher or lower frequencies may be needed for resonance in other systems. The distance "D" between electrodes having the same phase relationship may be of the order of one inch up to forty inches for many embodiments but larger or smaller distances may be used in some applications. The actual spacing between adjacent electrodes is often in the order of one-half inch to six inches but may be made larger or smaller in some applications. Voltages of the order of 2,000 volts to 20,000 volts may be applied between adjacent electrodes and total peak to peak alternating voltages of the order of 5,000 volts to 75,000 volts may be applied between electrodes having a 180 degree phase difference but in some applications larger or smaller voltage differences may be used. If the average accelerating voltage gradient needed to obtain the desired resonance velocity V is too low to produce a corona discharge then the short high voltage pulses are impressed on the alternating potential pulse to obtain the desired ionization by corona discharge.

When direct current excitation is used the charged particles are accelerated to a velocity determined in part by the voltage gradient, the average concentration of charge on each particle, the concentration of charge particles, and the viscosity of the air or other fluid medium. Each electrode element is at a higher potential than the preceding element of the series.

FIGS. 15, 16 and 17 illustrate the characteristics of the excitation systems employing the alternating potential wave forms of FIGS. 6, 7 and 8 respectively when operating at resonant velocity in conjunction with one form of electrode element. In the description of these systems the characteristic curves indicated have not included the ionization pulses which may be used in some applications if the desired accelerating voltage wave is not adequate to produce the desired intensity of ionization. In each of these figures four of the electrode elements designated 101, 102, 103 and 104 are indicated along the left end of the figure followed by a succession of eight vertical voltage-distance curves each showing the potentials of the four electrodes and the positions of masses of positive and negative charged particles propelled by the electrodes; the eight curves represent the voltages and the positions of the charged particles at eight equally spaced instants of time during a full cycle of the excitation wave. The excitation wave for the electrodes 101 and 103 has been indicated in each of FIGS. 15, 16 and 17 along the lower portion of the figure on a time base, the eight positions indicated being taken at instants of time designated $t_0$ to $t_7$, inclusive, along the excitation wave; the excitation wave for the alternate electrodes 102 and 104 which is not shown is identical in form but 180 degrees out of phase with the excitation wave shown. The electrodes 101 and 103 thus correspond to electrodes 30a in the previous diagrams and the electrodes 102 and 104 correspond to electrodes 30b. Alternate ones of the masses of charged particles are positively and negatively charged respectively as indicated in FIGS. 15, 16 and 17. Although the charged particles within each of the masses or clusters repel each other and tend to diffuse outwardly, these masses remain substantially intact as they are propelled past electrodes 101, 102, 103 and 104.

FIG. 15 illustrates the resonant velocity characteristics when the electrodes are excited by a sine wave. The first curve at the right of the electrodes and designated $t_0$ represents the instant when the excitation wave on electrodes 101 and 103 is at its maximum positive potential and electrodes 102 and 104 are maximum negative. The electric field potential curve plotted against the distance along the series of electrodes comprises flat portions along the length of the electrodes and sloping portions connecting the positive and negative potential value of the adjacent electrodes. The wide electrode consisting of electrically conducting material causes the electric field potential to remain essentially constant over the width of the electrodes thereby producing the flat portion of the curve. At the instant $t_0$ the positive charged particles are moving from 101 toward 102 and from 103 toward 104 along a decreasing potential field and negative charged particles are moving from 102 toward 103 along an increasing potential field. The mass of positive charges is attracted toward the negative electrode and repelled from the positive electrode and the mass of negatively charged particles is attracted toward the positive electrode and repelled from the negative electrode. At the end of the interval of time between $t_0$ and $t_1$ the masses of particles have moved to their positions shown in curve $t_1$ and it will be noted that the potentials of the electrodes have been reduced to the values at $t_1$ on the excitation sine wave extending along the lower portion of the figure. The particles continue to move and at the instant $t_2$ they are in the position shown in curve $t_2$. At this instant the potentials are zero on all electrodes and the polarity of the electrodes is about to change. In the next curve at time $t_3$ the potentials of the electrodes and the direction of the electric field have been reversed to give the values shown in curve $t_3$, the electrodes 101 and 103 being negative and the electrodes 102 and 104 positive. The positive charges which were propelled from 101 toward 102 at the instant $t_0$ are now adjacent or past 102 and are being propelled from 102 toward 103 by this reversed electric field. Likewise the negative charged particles which were propelled by the electric field from 102 toward 103 at time $t_0$ will now have moved to a position above or past electrode 103 and the reversed electric field will propel them from 103 toward 104. The potentials continue to increase with time along the sine wave excitation curve until at the time $t_4$ the electrodes have opposite potentials of equal magnitude to those shown at $t_0$. The progress of the masses of charged particles may be traced through successive increments of time to $t_5$, $t_6$, $t_7$ and return to $t_0$ on the curves labeled accordingly. It will be noted that the electrodes excited in this manner are electrically analogous to the loops of a standing wave with the nodes of the analogous standing wave being located between the electrodes. When this excitation system has the proper relationship between accelerating voltage, electrode spacing, and frequency such as to propel the mass of charged particles at the correct velocity to always pass over each wide electrode as it changes polarity and enters the electric field between each pair of electrodes when that field is oriented in the direction to further accelerate the charged particles movement, then resonance conditions are established. This periodic kick or acceleration given the charged particles as they are propelled through the electric field between electrodes when resonance conditions are established produces what is called the "traveling wave effect." This means that the charged particles are progressively propelled along the desired flow path giving a propulsion effect similar to that of a traveling wave.

It should be noted that under most conditions more negative ions are produced by the corona discharge than positive ions. The higher concentration of charges in the mass or cluster of negative ions will cause it to accelerate more rapidly than the masses of positive ions. When this unbalanced condition exists, the system should be tuned for resonance with the dominant mass of negative ions.

FIG. 16 shows the same electrodes as those illustrated in FIG. 15 but with a square wave excitation impressed on the electrodes. In the square wave form as illustrated at the bottom of FIG. 16 the portion passing through the zero between maximum positive and maximum negative is relatively short and steep and the time intervals have been selected so that all the instants $t_0$ through $t_7$ are at maximum potentials. The operation of the system in moving the positive and negative charged masses is essentially the same, however, and can be followed in the same manner. The first two time intervals $t_0$ and $t_1$ occur during the first positive flat top portion of the wave and the polarity of the wave changes during the period between $t_1$ and $t_2$ thereafter $t_2$, $t_3$, $t_4$ and $t_5$ are all instantaneous times during the flat top portion of the negative going wave. This is then followed by $t_6$ and $t_7$ occurring at instants during the following positive portion of the wave and $t_0$ is then repeated as the start of the next cycle. It will be understood that these positive and negative portions of the wave have reference to the excitation of the electrodes 101 and 103 and that the electrodes 102 and 104 which are connected to the opposite side of the generator are at opposite potentials. When the proper relationship is established between the accelerating voltage, electrode spacing and frequency to achieve resonance, then the "traveling wave effect" will propel each of the masses of charged particles progressively along the series of electrode elements. As a result of the square wave form the masses of charged particles are propelled more effectively in the arrangement of FIG. 16 because the potentials are maximum for a greater length of time in each half cycle as compared with the arrangement shown in FIG. 15. Some improvement may be obtained by decreasing the magnitude of the excitation voltage wave to a value lower than that required for ionization and then superimposing a higher voltage ionization pulse or series of pulses over a portion of each half cycle of this wave.

In order to decrease still further the loss of ions by capture or neutralization, an excitation arrangement such as shown in FIG. 17 may be employed; in this arrangement a flat top wave form is used which has a period of zero potential between the positive and negative flat top portions of the waves. In FIG. 17 at the instant $t_0$ the masses of particles are in essentially the same positions and the electrodes are the same potential as in FIGS. 15 and 16. From $t_0$ to $t_1$, the electrode potentials remain unchanged but the particles have moved forward toward the next adjacent electrodes; the potential thereafter changes to zero, and during the subsequent period including the instants $t_2$ and $t_3$ the potential remains at zero while the masses of charged particles coast forward. Between $t_3$ and $t_4$ the polarities of the several electrodes are reversed, as shown in curve $t_4$; masses of positive charges are now being attracted toward the electrodes 101 and 103 which now have a negative potential and masses of negative charges in a similar manner being attracted toward the electrodes 102 and 104 and repelled by the opposite electrodes. On passing from time $t_5$ to $t_6$ the polarities again fall to zero and are maintained zero during the subsequent period including the instants of time $t_6$ and $t_7$, after which they are again reversed and return to the same polarities as at $t_0$.

It will be apparent from the foregoing that the movement of charged particles over a series of electrodes as indicated in FIGS. 15, 16 and 17 may be controlled by controlling the configuration and width of the electrodes and by controlling the wave form of the exciting potential.

Figure 18:
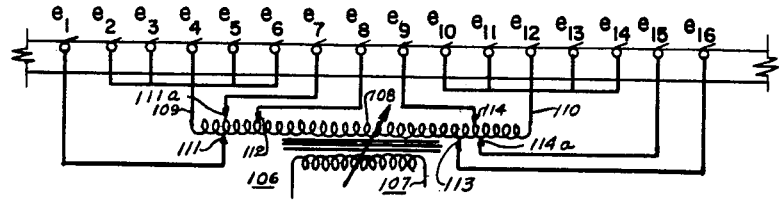
FIG. 18 is a schematic diagram illustrating another embodiment of the excitation system of the invention.
Figure 19:
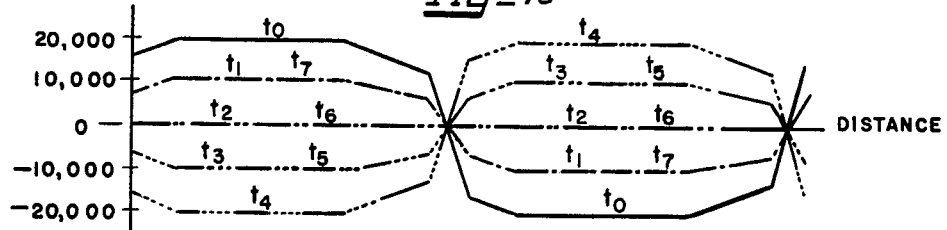
FIG. 19 is a graph illustrating the characteristics of operation of the system of FIG. 18.
Figure 20:
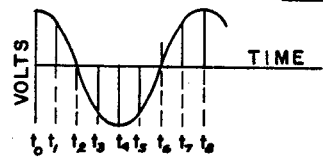
FIG. 20 is a voltage curve applicable to a portion of the system of FIG. 18.

The electrode excitation system shown in FIG. 18 employs an alternating current transformer 106 having a primary connected to a suitable source of alternating current and a step-up secondary 108 which is tapped and has its output terminals connected to a series of electrodes indicated as $e_1$ to $e_{16}$, inclusive; these electrodes have been indicated as of circular cross section with corona discharge points facing toward the right. The two end terminals of the secondary winding 108 are connected to two separate groups of electrodes, the first terminal indicated at 109 being connected to the electrodes $e_2$ through $e_6$ and the other terminal indicated at 110 being connected to the electrodes $e_{10}$ through $e_{14}$. All of the electrodes within each of the respective groups are thus maintained at the same potential during the operation of the system, this potential being the alternating potential at the respective end terminals of the transformer secondary. Six variable taps are employed in the secondary as indicated at 111, 111a, 112, 113, 114 and 114a; the taps 111 and 111a are connected to the electrodes $e_1$ and $e_7$, respectively, and the taps 114 and 114a to electrodes $e_9$ and $e_{15}$, respectively. The inner taps 112 and 113 are connected, respectively, to the electrodes $e_8$ and $e_{16}$. It will be seen that the connections provide two main groups of electrodes one from $e_1$ to $e_8$ and the other from $e_9$ to $e_{16}$. During the operation of the system the alternating potential varies so that in a complete cycle the electrodes of the first group vary in voltage from a maximum positive voltage to a maximum negative and back to maximum positive, while the electrodes of the second group vary in exact opposite phase from the maximum negative voltage to a maximum positive and back to a maximum negative. This variation in potential along the series of electrodes at eight instants of time during each cycle is illustrated as curves marked $t_0$, $t_1$, $t_2$, $t_3$, $t_4$, $t_5$, $t_6$ and $t_7$ on the graph FIG. 19. In these curves, the distance along the electrode line of FIG. 18 is plotted along the $x$-axis the voltage is plotted along the $y$-axis. The voltage wave form used in this example is shown as a graph of voltage against time in FIG. 20. The instants of time $t_0$ through $t_7$ and back to $t_0$ and the corresponding voltage applied to electrodes $e_2$ to $e_6$ are indicated on this graph. In some applications, other wave forms can be used advantageously. In the circuit FIG. 18 it will be noted that the first electrode $e_1$ is connected to the tap 111 so that its voltage is below maximum at the instant $t_0$ when the voltage on the electrodes $e_2$ through $e_6$ is maximum. Following the curve of voltage against distance at the instant $t_0$ in FIG. 19 it will be noted that the group of electrodes $e_2$ through $e_6$ is at a maximum positive potential and that electrodes $e_7$ and $e_8$ have successively lower positive potentials. Electrode $e_9$ has a negative potential and electrodes $e_{10}$ through $e_{14}$ have successively less negative voltage and the next electrode in line (not shown) would have the same potential as $e_1$. As the voltages fall to the values at $t_1$ in the graph 20 the curve $t_1$ represents the voltages along the electrode line, all of which are of course less than the voltages at $t_0$. The voltages then continue to fall to the point $t_2$ at which the curve of FIG. 20 reaches the zero axis and the electrode potentials are represented by the center or reference line of FIG. 19. The voltages then become negative on the first group of electrodes $e_1$ to $e_8$ and positive on the second group $e_9$ to $e_{16}$ and increase until the time $t_4$ when the voltages represented by the curve $t_4$ are the maximum negative voltages for the first group of electrodes and the maximum positive for the second group; the voltages then reverse again so that the voltages at the instants of time $t_5$, $t_6$ and $t_7$ are respectively the same as those existing at $t_3$, $t_2$ and $t_1$ but the direction of voltage change with time is opposite. And finally the voltages return to their values at $t_0$. It will be noted that this excitation system provides an arrangement whereby the voltages in one group $e_1$ through $e_8$ are changing with time oppositely with respect to the voltages of the second group $e_9$ through $e_{16}$, the zero voltages at all times occurring between the electrodes $e_8$ and $e_9$ and between the electrode $e_{16}$ and the next electrode (not shown). A similar zero point exists at the left end of the graph which has not been illustrated. This system thus provides an alternating potential excitation along the series of electrodes which is analogous to a standing wave where the electrode groups $e_2$ through $e_6$ and $e_{10}$ through $e_{14}$ are electrically comparable to standing wave loops and the nodes occur between electrodes $e_8$ and $e_9$ at approximately time $t_0$ and between $e_{16}$ and $e_1$ of the next series. By way of example, a mass of positively charged particles coasting through the nearly zero potential field above the group of electrodes $e_2$ through $e_6$ and emerging into the electric field from $e_6$ to $e_7$ to $e_8$ to $e_9$ to $e_{10}$ will be given a kick or acceleration toward the right along the electrode line by this high electric field strength. As the charged particles pass electrode $e_{10}$ they enter a near zero potential field extending from $e_{10}$ to $e_{14}$ where they can coast with essentially no electrical forces. If the system is tuned for resonance, the direction of the electric field will be reversed (time $t_2$ to $t_3$) by the time the first portion of the mass or cluster of positive charged particles emerge from the zero potential field between $e_{10}$ and $e_{14}$ and enter the electric field between $e_{14}$ and $e_2$ of the next electrode series (not shown). From time $t_3$ to $t_5$ the mass of positive charged ions will pass through this electric field from $e_{14}$ through $e_2$ and then coast through the zero field area above the electrodes $e_2$ through $e_6$ of the second series of electrodes. During this same interval of time from $t_3$ to $t_5$ a mass or cluster of negative ions will be kicked or accelerated through the electric field from $e_6$ toward $e_{10}$; and in subsequent time they coast through the near zero electric field area from $e_{10}$ to $e_{14}$. If some of these negative ions arrive at $e_{14}$ slightly before the electric fields are reversed at time $t_6$ they will enter an adverse electric field beyond $e_{14}$ which will slow down the high speed lead ions and cause them to be bunched together with the rest of the main cluster or mass of ions. The proper adjustment of the tap positions 113, 114, 111 and 112 can shape the electric field to facilitate clustering these ions into a higher concentration, and thereby minimize diffusional losses. Also the length of the coasting path between $e_2$ and $e_7$ and between $e_{10}$ and $e_{14}$ can be adjusted to minimize losses and to achieve improved performance.

If the quantity of negative ions produced by the corona greatly exceeds the quantity of positive ions, then the system should be tuned predominantly for resonance with the masses or clusters of negative ions. Resonance is achieved when the excitation voltage, the distance between electrodes, the number of electrodes in a complete cycle, and the frequency are adjusted so that each mass or cluster or ions emerge from the coasting area into the strong electric field area at the proper time to receive a kick or acceleration in the direction of desired flow along the series of electrodes. When this resonance is achieved, then the resulting "traveling wave effect" will propel each of the masses of charged particles progressively along the series of electrode elements.

Figure 21:
FIG. 21 is a sectional view of another electrode arrangement suitable for operation with the system illustrated in FIG. 18.

FIG. 21 illustrates a modified arrangement of the electrode line of FIG. 18 and provides an arrangement whereby the group of electrodes $e_2$ through $e_6$ and $e_{10}$ through $e_{14}$ are replaced, respectively, by continuous bar or strip electrodes 116 and 117; the remaining electrodes are the same as those in FIG. 18 and have been designated in the same manner $e_1$, $e_7$, $e_8$, $e_9$, $e_{15}$ and $e_{16}$ and these electrodes act in the operation of the system in the same manner as the corresponding group of electrodes in FIG. 18. These strip electrodes are formed with rounded left and right end portions similar in configuration to the electrodes of FIG. 18 and which are connected by a body portion of a thickness less than the diameter of the rounded portions and providing a flat generally convex area on the upper sides of the electrode. These areas are filled or coated with plastic or other insulating material which may be the same as that which surrounds the electrodes and thus provide two exposed electrodes in conducting relationship and separated by an insulating area. During the operation of the system a portion of each of the masses of charged particles moving over the electrodes 116 and 117 collects on the insulated surface between the two end portions and after a certain amount of electric charge has accumulated, the resulting electric field intensity prevents additional ions from striking this surface and thereby minimizes the loss of charge from that mass of particles. This surface charging effect on the insulation surface over each electrode element, of course, occurs during each half cycle and represents a small continuous loss during operation of the system. This loss is calculated to be in the order of 20 to 80 watts per square foot of area. However, this loss is less than that occurring when the entire surface of the electrode is of conductive material, in which case the charges reaching the electrode surface are conducted through the voltage generating system and do not build up a counter-potential. The electrodes 116, furthermore, are constructed so that the first rounded portion or rear edge of the electrode is smooth while discharge points are provided at the forward end, these points being in the form of rows of points constructed in the same manner as described in connection with the previous illustrations.

Figure 22:
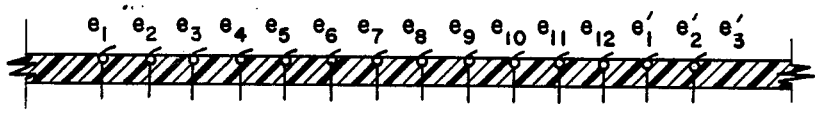
FIG. 22 is a sectional view through a line of electrodes for illustration of another embodiment of the invention.
Figure 23:
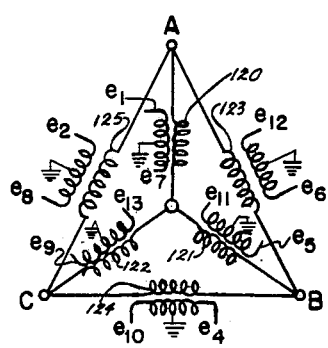
FIG. 23 is a diagrammatic view of the transformer connection for the electrodes of FIG. 22.
Figure 24:
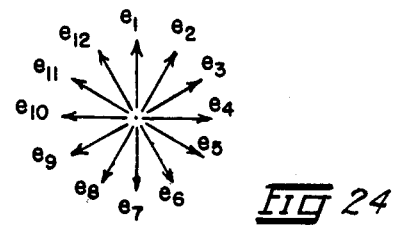
FIG. 24 is a graph illustrating the vector relationship of the potentials produced by the transformer of FIG. 23.

FIGS. 22, 23 and 24 illustrate another excitation system embodying the invention. FIG. 22 shows a line of electrodes numbered $e_1$ through $e_{12}$ and then repeating $e_1$, $e_2$ and $e_3$, this being a portion of a continuous repeating pattern of twelve electrodes. The excitation transformer connections for this line of electrodes are indicated in FIG. 23 and comprise an arrangement such that the successive electrodes from 1 through 12 are excited at equal phase differences of the alternating potential. The phase difference between the electrodes is indicated in FIG. 24 where the potential of each of the electrodes is indicated by a vector bearing the designation of its respective electrode. The excitation system for the line of electrodes comprises a network of transformers three connected in star and three in delta to the three terminals of a three-phase source, these terminals being indicated at A, B and C. The voltage wave on each of these terminals is 120 degrees out of phase with that on each other terminal. The primary windings of the transformers are connected in this star-delta arrangement, the three primary windings of the star connection being designated 120, 121 and 122 and those in the delta connection 123, 124 and 125. The end terminals of the transformer secondaries are connected to the electrodes and the terminals of these secondaries have been indicated by the designations of the electrodes to which they are connected; thus electrodes $e_1$ and $e_7$ are connected to the transformer 120, $e_5$ and $e_{11}$ to 121, $e_4$ and $e_3$ to 122 and in a similar manner $e_{12}$ and $e_6$ are connected to 123, $e_{10}$ and $e_{11}$ to 124, and $e_8$ and $e_2$ to 125. The center taps of each of these secondary windings are grounded. This connection provides an arrangement whereby each of the two electrodes connected to any one of the secondaries are at opposite potentials at any instant of time during the alternating current cycle and the connections as shown are further arranged so that the successive electrodes $e_1$ through $e_{12}$ are at 30 degrees phase difference and provide successive potentials from the line of electrodes. By this arrangement electrode $e_2$ lags 30 degrees behind $e_1$ and electrode $e_3$ lags 30 degrees behind $e_2$ and so on through the series of electrodes. This moves the charged particles along the electrode line at a rate determined by the frequency of the alternating potential and by the spacing between the electrodes. This arrangement thus provides an electric field along the line of electrodes which is in the form of a true traveling wave. The velocity of the traveling wave is $V=fxd$ where V is the velocity in cm./sec., $f$ is the frequency in cycle/sec. and $d$ is the distance in centimeters between electrodes of the same phase. These units can also be measured in feet/sec., cycles/sec., and feet per cycle, respectively. When the excitation voltage and frequency are adjusted so that the charged particles are propelled along the airfoil surface at the same velocity as the traveling wave, resonance is achieved. This high velocity flow of charged particles and the induced surface layer flow of the ambient fluid over the airfoil reduces the fluid pressure on the airfoil surface thereby causing lift.

Figure 25:
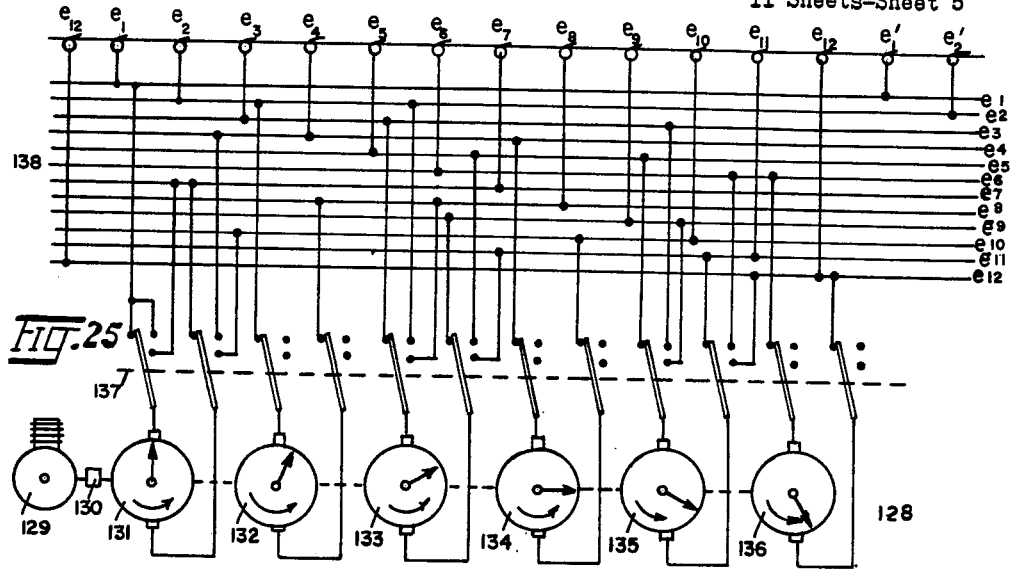
FIG. 25 is a schematic diagram of a system providing speed changing control.

FIG. 25 is a schematic diagram illustrating another embodiment of the invention wherein the excitation system produces a traveling wave along the electrode line and illustrates further a switching arrangement for changing the velocity of the traveling wave and consequently the resonant velocity of the charged particles moving along the line of electrodes. This switching means for changing the velocity of the charged particles and the ambient fluid flow is used in conjunction with variations of frequency to control the lift or speed of the aircraft or other body on which the system is mounted. In FIG. 25 the line of electrodes comprises groups of electrodes designated $e_1$ through $e_{12}$ and these electrodes are connected to be excited by a multiphase generator 128 driven by an internal combustion engine 129 through a speed changing transmission 130. The generator 128 comprises six generating elements designated 131 through 136, inclusive; these generator elements are operated so that they produce alternating current potentials which are successively 30 degrees out of phase, this phase difference being indicated diagrammatically in the figure by the position of the arrows on the respective generating elements. The rotation of this vector arrow is counter-clockwise which means that the voltage on $e_2$ lags 30 degrees behind the voltage on $e_1$, $e_3$ lags 30 degrees behind $e_2$ and so on through the series of electrodes. The voltage wave on the lower terminal is 180 degrees out of phase with the voltage on the upper terminal. Therefore the lower terminal of the generator element 131 is connected to electrode $e_7$ while the upper terminal is connected to $e_1$, and so on through the series of generator elements. The terminals of the generating elements are connected to pairs of switch blades all of which are assembled as a gang or unit actuated by a common mechanism indicated generally by the dotted line 137. In their left hand positions as shown in the figure these switches connect the top terminals of the generators 131 through 136, respectively, to the electrodes $e_1$ through $e_6$ and the bottom terminals, respectively, to the electrodes $e_7$ through $e_{12}$. The connections between the generators and the electrodes are made through a cable 138 the separate wires of which are indicated by the same designation as the electrodes to which they are connected.

Figure 26:
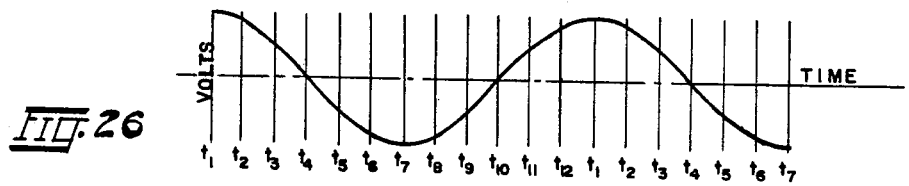
FIG. 26 is a graph showing a potential wave form of the excitation system for the system of FIG. 25.

FIG. 26 is a graph showing the alternating potential wave form of generator element 131. This wave has for purposes of illustration, and not by way of limitation, been illustrated as a sine wave; however, for many applications it may be desirable to employ flat topped wave forms. The shaped wave may be modified for other applications by the use of high voltage pulses such as indicated in FIGS. 10 and 11. In FIG. 26 a plurality of instantaneous times are indicated for a period including the times from $t_1$ to $t_{12}$, these being at equidistant points through a complete cycle so that each interval is one-twelfth of a cycle and represents a phase change of thirty degrees. The wave forms for the other generators 132 to 136 are the same except that each successive one in point of time is thirty degrees lagging in phase with respect to the preceding generator.

Figure 27:
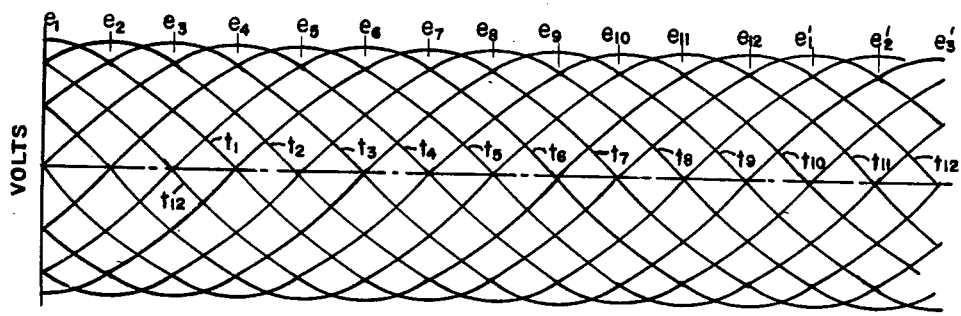
FIGS. 27 and 28 are graphs illustrating high and low speed characteristics of the control.

FIG. 27 is a graph showing the change in potential of the electrodes along the line when the switches are in their high speed or left hand position as shown in FIG. 25. In this figure the voltage is plotted against distance along the line of electrodes. The figure comprises a plurality of curves at spaced time intervals indicated at $t_1$ through $t_{12}$. For additional periods the curves repeat because the interval between $t_1$ and the next instant, say $t_{13}$, represents a full cycle of the potential wave and a curve designated $t_{13}$ would be identical to the curve $t_1$. The graph FIG. 27 represents the potentials of the electrodes along the line $e_1$ through $e_{12}$ at each of the instants of time represented by the individual curves. The wave produced by this multiphase system is a true traveling wave and, at resonant velocity, the charged particles move in synchronism with the wave. At time $t_1$ a relative high electric field intensity exists from electrode $e_2$ to electrode $e_6$ causing the propulsion of and, if high enough intensity for corona, the generation of positive ions over this interval. From $e_6$ to $e_8$ the field intensity is relatively low in which the ions which get ahead of their proper position in the traveling wave will coast and tend to slow down. At the same instant of time $t_1$, the high intensity electric field from electrode $e_8$ to electrode $e_{12}$ will propel negative ions toward the right and, if the electric field intensity is high enough to produce corona, a concentration of negative ions will be created in this interval. If some of these negative ions get ahead of the traveling wave they will enter the low intensity field from $e_{12}$ to $e_2'$ where they will coast and slow down. As the traveling wave moves forward in the next instant of time it will again pick up and accelerate these negative ions which got ahead and were slowed down. In this manner, the mass or cluster of ions tend to remain intact thereby minimizing losses. For each successive instant of time $t_2$, $t_3$, $t_4$, $t_5$, etc. the traveling wave advances one electrode spacing. In this system the clusters of ions are continuously in the high field intensity portion of the traveling wave and are never in a coasting position. Only the ions which get ahead or behind this high intensity portion of the traveling wave will enter a coasting situation. Those ions getting ahead of the traveling wave will slow down and consequently rejoin the ion cluster being advanced by the traveling wave. A flattening of a small part of the voltage wave crest on each half cycle may be employed to facilitate keeping these clusters of ions intact. Furthermore a small pulse at the leading edge of the flat top portion of each half cycle may be used to provide an extra acceleration for these ions which tend to lag behind the traveling wave and thereby cause them to catch up and join the ion masses being advanced by the traveling wave.

When the voltage is sufficiently high, corona discharge is produced at time $t_1$ over the distance from $e_2$ to $e_6$ and from $e_8$ to $e_{12}$ which covers two-thirds of the surface area. Only one-third of the area involving the distance from $e_6$ to $e_8$ and from $e_{12}$ to $e_2'$ is dead or not used insofar as corona discharge is concerned. At each successive time interval, these areas advance with the traveling wave, but the ratio of about two-thirds of the area involved in corona discharge and one-third in coasting area still remains. This system makes it possible to put a large amount of energy into each unit area of the airfoil surface and thus produce a high velocity flow of ions and fluid media with a consequent large reduction of fluid pressure.

When the switch operator 137 is moved to the right to connect the switches to the right hand positions, the generator elements 132, 134 and 136 are disconnected while each of the other generator elements has each of its terminals connected to a selected pair of the electrodes. Thus the top terminal of the generator element 131 is connected to electrodes $e_1$ and $e_7$ and its bottom terminal is connected to electrodes $e_4$ and $e_{10}$; the generator 133 has its upper terminal connected to the electrodes $e_2$ and $e_8$ and its lower terminal connected to electrodes $e_5$ and $e_{11}$; and generator 135 has its upper terminal connected to electrodes $e_3$ and $e_9$ and its lower terminals connected to electrodes $e_6$ and $e_{12}$.

Figure 28:
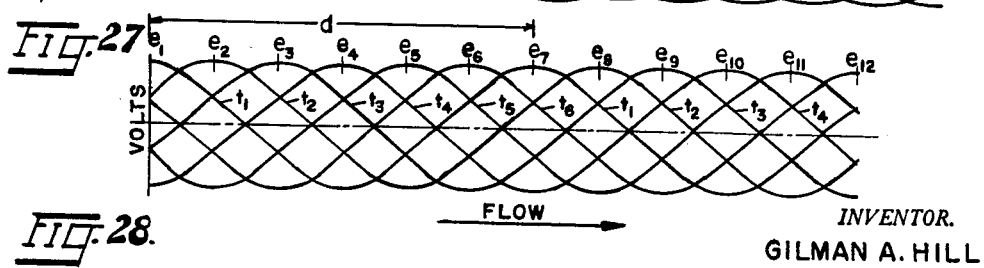

This right hand position of switch 137 is the low speed position at which the resonant velocity is reduced to one-half that of the full speed position. The voltage-distance curve for this condition of operation is illustrated in FIG. 28 and it will be noted that the complete cycle takes place in the distance of six electrodes instead of twelve; this is readily apparent when it is noted that the generator elements 131, 133, and 135 are being used and that these generator elements provide voltages 60 degrees out of phase with one another. Thus the resonant velocities for the left-hand and right-hand switching positions provide full and one-half speed, respectively. On the curve FIG. 28 the curves for the instants of time $t_7$, $t_8$, $t_9$ and $t_{10}$ are identical with the curves $t_1$, $t_2$, $t_3$ and $t_4$, respectively.

Figure 29:
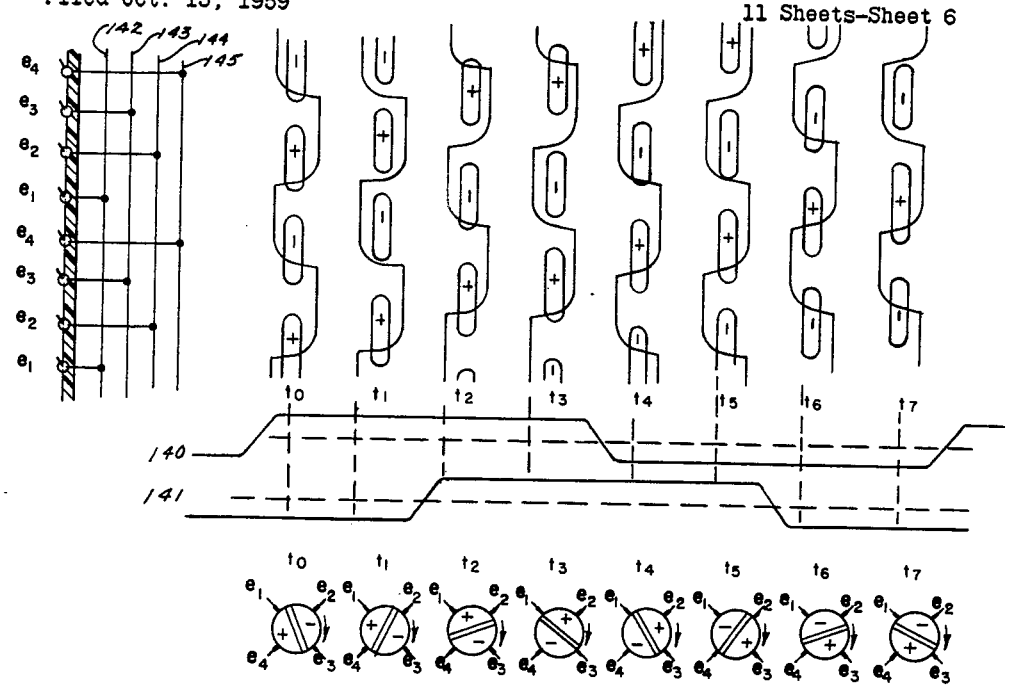
FIG. 29 is a schematic diagram illustrating another excitation system and its characteristics.
Figures 30, 31:
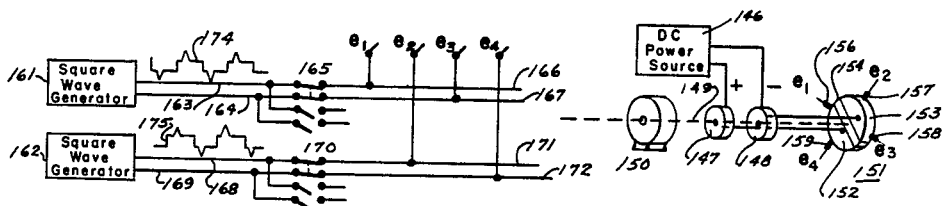
FIG. 30 is a diagrammatic illustration of the current generator for use in the system of FIG. 29.
FIG. 31 is a schematic diagram illustrating another embodiment of the excitation system of the invention.

The excitation system shown in FIG. 29 employs a direct current power source, indicated in FIG. 30, to produce two excitation voltages each comprising alternate positive and negative bursts as indicated by the curves 140 and 141. The bursts of positive and negative excitation of the two excitation curves 140 and 141 are 90 degrees out of phase with one another. Dotted lines on the curves indicate the sudden transition from positive to negative which is effected by current interruption as described below.

FIG. 29 has been drawn similarly to FIGS. 15, 16 and 17 and shows diagrammatically the physical arrangement of the electrodes together with the curves showing the potentials at eight different instants of time at equally spaced intervals. This diagram also includes diagrams of the eight corresponding positions of the generator FIG. 30 in alignment with the curves for the eight intervals of time. Eight electrodes of a line are indicated at the left-hand side of the figure and are designated in groups of four electrodes indicated at $e_1$, $e_2$, $e_3$ and $e_4$ in each group. These electrodes are connected to four bus bars or leads 142, 143, 144 and 145 connected, respectively, to the electrodes $e_1$, $e_2$, $e_3$ and $e_4$ of each group. The generator shown in FIG. 30 comprises a direct current power source 146 and a pair of slip rings 147 and 148 mounted on a shaft indicated by a dotted line 149 and connected by brushes, respectively, to the positive and negative terminals of the generator 146. A motor 150 is provided to drive the shaft 149, and a commutator 151 is mounted on the other end of the shaft on the far side of the slip rings 147 and 148; the commutator comprises two conducting segments 152 and 153 connected, respectively, to the positive and negative slip rings 147 and 148 and separated from one another by a bar of insulating material 154 extending diametrically of the commutator. The direct current potential is picked off the commutator by four brushes 156, 157, 158 and 159 which are provided for connection to the bus bars 142, 143, 144 and 145, respectively, of FIG. 29. For the purposes of quick reference these terminals 156 through 159 have been marked with the electrode designations $e_1$, $e_2$, $e_3$ and $e_4$ corresponding to the electrodes to which the brushes are connected. Each of the instantaneous time diagrams of FIG. 29 includes a representation of the commutator 151 in its position for producing the corresponding voltage relationship. The insulating bar 154 is sufficiently wide that no brush engages both conducting halves of the commutator at one time and that no corona or spark-over occurs from one half to the other.

The connections of the generator of FIG. 30 are such that the electrodes $e_1$ and $e_3$ are always opposite, the brush 156 being negative when the brush 158 is positive and vice versa. In a similar manner the electrodes $e_2$ and $e_4$ are always at opposite polarities since the brushes 157 and 159 always engage diametrically opposite sides of the commutator 151. The excitation voltages shown on the curves 140 and 141 are the potentials of the electrodes 1 and 2, respectively, and it is to be understood that the potentials of the opposite electrodes 3 and 4, respectively, are at equal and opposite polarity at each instant of time. Thus in reference to the curve 140 and the corresponding diagrammatic positions of the commutator it will be noted that the potentials of the electrode $e_1$ is positive at the first four time instants and changes to negative for the second four instants of time. The electrodes $e_2$ which are connected to the brush 157 at 90 degrees to the brush 156 on the commutator 151 reach their respective potentials at an effective phase difference of 90 degrees; thus in curve 141 the electrodes $e_2$ are negative at the first two times $t_0$ and $t_1$, change to positive and remain positive through the period including the times $t_2$ through $t_5$, then return again to negative during the period including times $t_6$ and $t_7$. The potentials resulting from operation of this generator arrangement provide in effect two periodic or alternative current potential waves which are 90 degrees out of phase with one another. This is thus a two-phase alternating potential system and produces a true traveling wave.

The action of the electrode system upon excitation to produce movement of the charged particles over the series of electrodes is essentially similar to that which takes place in connection with the systems heretofore described; and the diagram of movement of the positive and negative masses of charged particles is similar to the diagrams in FIGS. 15, 16 and 17. At the time $t_0$ the masses of positive particles are moving from the positive electrodes $e_1$ toward the negative electrodes $e_2$ and at $t_1$ these potentials remain the same and the masses of particles are moving in the same manner. The negatively charged particles in a similar manner are moving away from the negative electrodes $e_3$ toward the positive electrodes $e_4$. Between the times $t_1$ and $t_2$ the voltage wave 141 changes polarity so that the electrodes 1 and 2 are both positive and the electrodes 3 and 4 negative and the positive charged masses are moving down this gradient from the electrodes 2 toward the electrodes 3 while the negative masses are moving away from the negatively charged electrodes $e_4$ toward the positively charged electrodes $e_1$; the relative excitation of the electrodes changes again between $t_3$ and $t_4$ and at the time $t_4$ when the electrodes $e_1$ and $e_4$ are negative and the electrodes $e_2$ and $e_3$ are positive, the positive charges are propelled away from the electrodes $e_3$ toward the electrodes $e_4$ and the negative ions move from $e_1$ toward $e_2$. Just before the time $t_6$ the potentials are again changed, the electrodes $e_1$ and $e_2$ now being negative and the electrodes $e_3$ and $e_4$ positive; under this condition of excitation the positively charged masses are moving along the electrode line away from the positively charged electrodes $e_4$ toward the negatively charged electrodes $e_1$ while at the same time the negative masses are moving along the line away from the negatively charged electrodes $e_2$ toward the positively charged electrodes $e_3$. It is observed that between every other pair of electrodes the ions are being propelled by an electric field and between all intermediate pairs of electrodes the ions are coasting through a zero potential gradient. After each quarter cycle the traveling wave advances one more electrode position and after time $t_7$ repeats the cycle starting at $t_1$. The conditions described are for the resonant velocity of the charged particles moving in synchronism with the traveling wave over the series of electrodes shown at the left-hand end of FIG. 29.

FIG. 31 illustrates an alternating current generator arrangement for producing essentially the same type of operation as that described in connection with FIG. 29. In this figure a group of four electrodes of a series are indicated by $e_1$, $e_2$, $e_3$ and $e_4$; these electrodes are connected to be excited by two square wave generators 161 and 162 which provide wave forms similar to those shown in FIG. 11. The square wave generator 161 is provided with output terminals 163 and 164 connected through a switch 165 to lines 166 and 167, respectively, which are connected to the electrodes $e_1$ and $e_3$ as indicated and to the corresponding electrodes in similar groups of four throughout the series. The generator 162 has output terminals 168 and 169 connected through a switch 170 with lines 171 and 172 connected, respectively, to electrodes $e_2$ and $e_4$ of the series. The output wave of the generator 161, as indicated at 174, is of generally square wave form with a high voltage pulse like that of FIG. 11 and a similar wave form, indicated at 175, but lagging 90 degrees is produced by the generator 162. Thus the excitation produced by these two generators is essentially similar to that represented by the waves 140 and 141 produced by the generator of FIG. 30, except that the present waves are continuous square waves rather than the interrupted waves produced by the generator of FIG. 30. The generators 161 and 162 thus produce continuous waves 90 degrees out of phase and provide a two-phase system producing a true traveling wave along the line of electrodes represented by the four electrodes $e_1$, $e_2$, $e_3$ and $e_4$. The fluid flow produced by excitation of the electrodes in FIG. 31 is at a resonant velocity dependent upon the frequency of the generators 161 and 162 and the distance between the electrodes.

Figure 32:
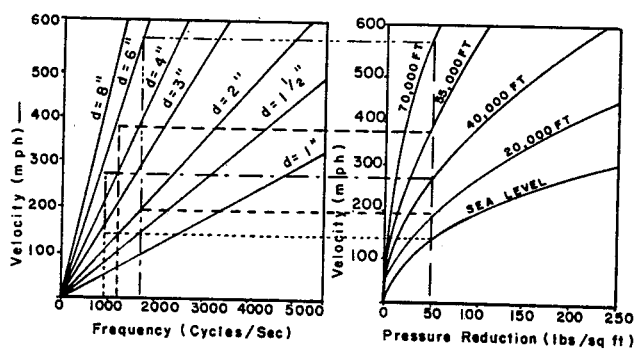
FIG. 32 is a graph including a set of curves illustrating the pressure and velocity characteristics of the systems of the invention.

FIG. 32 is a graph representing operating characteristics of the systems of the invention represented by way of example by the systems of FIGS. 15, 16, 17, 18, 22–23, 25, 29 and 31. In each of these systems surface layer fluid flow at a resonant velocity may be achieved. The left hand group of curves in FIG. 32 represent the changes in velocity with frequency for seven different electrode spacings. These spacings are the minimum spacings between electrodes having the same phase relationship. The curve represents spacings of one inch, one and one-half inches, two, three, four, six and eight inches and cover velocities within a range up to 600 miles per hour secured by frequencies up to 5,000 cycles per second. These electrode spacings and frequencies are shown by way of illustration and not limitation in that higher frequencies and greater spacing may be used. The right hand portion of the graph represents the pressure reduction in pounds per square foot resulting from the surface layer fluid flow at the resonant velocities measured in miles per hour and plotted along the vertical axis; the five curves of this portion of the figure representing the characteristics at sea level and at 20,000, 40,000, 55,000 and 70,000 feet altitude. Thus, by way of example, when a system embodying the invention is operated at a frequency of 800 cycles per second with a spacing between electrodes of like phase relationship of 6 inches, a resonant velocity of approximately 270 miles per hour is secured and at 40,000 feet a reduction in pressure of 50 pounds per square foot is obtained. The same reduction in pressure may be secured at the lower speeds of about 190 and 130 miles per hour at 20,000 feet and sea level, respectively, thus for the same spacing of electrodes the frequency of operation of the system may be reduced to about 550 and 400 cycles per second, respectively, at these lower altitudes. For the same resonant velotiy of 270 miles per hour giving a pressure reduction of 50 pounds per square foot the pressure reduction at the lower altitudes is substantially greater; for example, at 20,000 feet a pressure reduction of the order of 105 pounds per square foot may be secured and at sea level this reduction in pressure may be over 225 pounds per square foot. As elevation is increased in flight, the frequency must be increased to maintain a constant pressure reduction for sustenation. If a 50 pound per square foot pressure reduction is needed for sustenation, this can be achieved at sea level by a frequency of 800 cycles per second with a distance of three inches between electrodes of the same phase relationship and sufficient excitation voltage to achieve resonant velocity. At 20,000 feet this same condition can be achieved by increasing the frequency to about 1100 cycles/second. At 40,000 feet a frequency of about 1600 cycles/second is needed. However, if switching such as shown in FIG. 25 is provided so the distance between electrodes having the same phase relationship can be increased to six inches, then a frequency of only 800 cycles per second is needed to give the 50 pounds per square foot pressure reduction if resonant velocity is achieved by control of the excitation voltage. Using this spacing of six inches, a frequency of about 1100 cycles/second is required at an altitude of about 55,000 feet.

It follows that with the pressure differences available as shown on these curves effective sustenation of aircraft and other vehicles may be secured at relatively low resonant velocity, and pressure differences produced together with the minimum skin effect and low turbulence makes flight possible without power plants of the present conventional types.

The effective use of the excitation systems depends upon the proper construction and arrangement of the electrodes and several forms and arrangements of electrodes suitable for various purposes are illustrated by way of example in FIGS. 33 through 46.

The electrodes shown in FIGS. 33 and 34 represent a small section of the electrode surface of a system embodying the invention; the electrodes in this case are metal rods of round cross sections the tops of which are exposed above the insulating surface 180 as at 177; these rods are connected together in pairs by wires 178 so that each pair of electrodes is in effect a single electrode, both bars of the pair being at the same potential. The series of electrodes in FIGS. 33 and 34 is arranged for propelling the particles and the fluid flow from left to right as viewed in these figures and the right hand bar of each pair 177 is provided with a row of sharp points 179 positioned at a slight angle and extending just above the surface of the airfoil indicated at 180; these sharp points are provided to create a very strong electric field to produce a corona discharge and form the masses of charged particles required for operation of the system.

The construction of electrodes shown in FIGS. 35 and 36 is similar to that shown in FIGS. 33 and 34 except that electrodes instead of being coupled pairs of bars as in the first illustration comprise strips 181 having round or beaded edges 182 and 183, respectively, which provide a generally concave zone between the edges. The strips are embedded in the insulating body of the wing or other surface on which the electrode system is mounted and the concave areas between the beaded edges of the strips are coated or filled with insulating material as indicated at 184. Rows of points 185 for facilitating corona discharge are mounted on the forward edges 183. This arrangement operates in the same manner as the arrangement of electrodes of FIGS. 33 and 34.

When the electrodes of either of these arrangements are excited electric fields are set up in the manner indicated by the dotted equi-potential lines shown in FIG. 37; the electrodes of FIGS. 33 and 34 are illustrated, the left hand pair being shown as negative and the right hand pair at positive; a single electrode of a third and negative pair appears on the far right. A positively charged particle is shown above the negative pair of electrodes and a negative particle above the positive pair. The directions and velocities of the charged particles are indicated by the arrows extending from the particles above the pairs of electrodes. Initially during each half-cycle the particles are given a downward component of velocity by the electric field as shown in FIG. 37, a charge of the same polarity builds up, however, on the insulating surface between the two electrodes of each pair as a result of some of these first charged particles striking the surface and thereafter the particle is repelled from the surface and the velocity vector becomes substantially parallel to the surface as shown in FIG. 38. This results in a relatively small current loss during each half-cycle. This arrangement of electrodes in pairs and with the corona discharge needles on the leading edges and pointing in the direction of fluid flow provides an effective arrangement assuring a near zero potential gradient zone over which the charges coast.

In some applications of the invention it is desirable to provide an electrode system which may be reversed to provide the flow of fluid in either of two directions. A system of electrodes for this purpose is illustrated in FIGS. 39 and 40 in which alternate bars have been indicated at 186 and 187, the bars 187 are provided with dual sets of corona discharge points indicated at 188 and 189 the points 188 pointing to the left and the points 189 to the right. In order to utilize these electrodes in a two-way or reversible system a switching arrangement is provided so that the electrodes 187 may be connected in conducting relationship alternatively with the electrodes 186 on either side thereof. For this purpose as shown in FIG. 40 a switch 190 is provided in the lead from each of the bars 187 and may be connected either to a lead 191 from the left-hand bar 186 or a lead 191a from the right-hand bar 186. As illustrated the switches 190 are in their left hand positions and the pairs of electrodes are arranged for movement of the fluid from left to right, the right hand points 189 of the bars 187 being employed for corona discharge and no discharge taking place from the points 188 since the bars 187 and the left hand bars 186 are at the same potential. When it is desired to reverse the flow of fluid over the surface the switches 190 are moved to the right hand position whereupon the bars 187 are connected with the right hand adjacent bars 186 and the points 188 are employed for corona discharge.

Another form of electrodes suitable for reverse operation is indicated in FIGS. 41 and 42 which illustrates a plurality of electrodes having points 193 extending through the insulating surface of the wing or other structure 194 at the surface of which the electrode system is mounted. The points 193 are formed on bars 195 which extend along the lower face of the wall 194 and carry the points 193 which extend vertically from the bars upwardly through the wing surface. Since these upwardly directed points present the same configuration to the fluid flow regardless of the direction of flow the electrodes may be used for operation in either direction of movement of the fluid.

FIGS. 43 and 44 illustrate a reversing flow arrangement employing electrodes like those shown in FIGS. 41 and 42 for the purpose of forming directional electrodes with other bars located in the surface of the wall or wing structure. As shown in FIGS. 43 and 44 three bars 196 similar to the bars 195 of FIGS. 41 and 42 are mounted in spaced relationship below the wall structure 197 each of the bars 196 having vertically extending points 198 projecting through the wall 197 and slightly above its surface; between each set of points there are mounted three electrode bars designated 200, 201 and 202. Electrical connections are provided for arranging the electrodes in groups depending upon the desired direction of flow of the charged particles and fluid medium. Each of the electrode bars 196 is connected to a switch 203 and each of the bars 201 is connected to a switch 204; in the positions illustrated the switches 203 connect the electrodes 196 to the electrode 202 and the switches 204 also connect the electrode 201 to the electrode 202. Thus the electrodes 201 and 202 are connected to an electrode 196 on their right hand and provide a combined electrode which includes the points 198 for producing corona discharge at the forward edge of the electrode in the direction of fluid flow, the flow in this case being from left to right. When it is desired to reverse the flow of fluid medium, so that it moves from the right to left as viewed in FIG. 44, the switches 203 and 204 are reversed so that they are in their opposite positions and electrodes 201 and 200 are connected to the electrode 196 on their left; this connection thus provides a combined electrode having the discharge points 198 at its front edge in the direction of fluid flow.

The switching arrangement of FIGS. 39, 40, 43 and 44 may be employed with the various control and switching systems described heretofore so that the systems are capable of moving fluid in either of two selected directions. If a multiphase traveling wave system is used the phase relationships between successive electrode elements must also be reversed to reverse the fluid flow direction.

For some applications it is desirable to provide electrodes not only at the surface but for some distance above the surface and an arrangement for this purpose is shown in FIGS. 45 and 46 wherein the electrodes have been illustrated as comprising a series of four bars 206 the bottom bar of which is embedded in the wing surface or other body 207; these electrodes are connected by vertical strips 208 so that each set of four electrodes constitutes an array extending perpendicularly a substantial distance from the surface 207. Each of the bars is provided with a row of corona discharge points 209 so that this arrangement provides a series of arrays of electrodes arranged to produce a flow of charged particles from left to right as viewed in these figures.

The several electrode arrangements just described in connection with FIGS. 33 through 46 inclusive may be employed for producing pressure differences in accordance with Bernoulli's principle and also the reactive forces for effecting sustentation and propulsion of vehicles or other bodies in fluid media; the types of electrodes and their arrangement are selected in accordance with the particular application in which they are employed.

Various forms of self-propelled bodies including sustentation and propulsion systems embodying the invention are disclosed in FIGS. 47 through 65. It will be understood that, in the application of the system of the invention to these various types of vehicles and other apparatus, the sectionalizing of various areas of the surface of the equipment and the control of the excitation system both for effecting different velocities of flow of fluid medium and for reversing the flow may be employed. These various illustrations are diagrammatic but indicate the essential characteristics and arrangements of the fluid flow producing areas and the manner in which the electrode assemblies are arranged. In the various figures the electrodes have been indicated and corona discharge points have been shown. It will be understood, however, that these electrodes and their points have been shown exaggerated in spacing and size and reduced in number for purposes of illustration to indicate the direction of flow of fluid under influence of the electric fields produced by the electrodes.

Referring again to the drawings, FIG. 47 illustrates a device suitable for lifting and moving objects from place to place and which, for example, may be employed for the same purposes as a crane or derrick in handling heavy equipment. The housing or structure of this embodiment comprises an upper shallow bowl or saucer-shaped central area 215 and an outer similarly formed rim area 216, these areas being connected by a cylindrical wall portion 217. The upper area 215 is provided with a plurality of electrodes arranged in series in the form of closed circles 218 extending concentrically with the central axis of the device and arranged to propel the charged particles and air or other fluid medium in a circular path along the top surface in a counterclockwise direction when viewed from the top as indicated by the arrow. It will be evident that the reactive thrust produced by the electrodes in moving the charged particles about the circles of the upper portion produces a rotational force or torque on the body tending to turn the body about its axis in a clockwise direction as viewed from the top. In order to counteract this rotation the electrodes on the lower portion 216 are arranged to drive the charged particles and fluid medium in the opposite direction, or clockwise direction as viewed from the top, so that the reactive thrust acting in a counterclockwise direction will counterbalance the torque created by the electrodes on the upper portion 215. The operation of the excitation system, which may be one of those described above, produces a high velocity flow of air around the closed circular paths and creates a lifting force on the body to move it upwardly and to hold it in a hovering position and to control its descent. The power for this type of equipment may be provided through a suitable cable such as indicated at 219, and control wires may be included in this cable so that the entire control of the device may be effected from the ground or other station. This lifting device includes suitable chains or cables 220 provided with hooks 221 at their lower ends to which the usual slings or cables may be attached for lifting purposes.

The sustentation and propulsion system of this invention may be incorporated in many types of vehicles, and another form of vehicle which may be used for passenger service is illustrated in FIG. 48. This vehicle is provided with a body having vertical side walls 222 and top and bottom walls 223 and 224 which are curved in generally the same manner as an airfoil section. The vehicle is provided with a vertical tail assembly 225 which may be provided with control excitation surfaces of the same type as those shown and described in connection with the tail assembly of the aircraft in FIG. 1.

The aircraft of FIG. 48 has been shown as provided with a plurality of side windows 226 and a front observation window or windshield 227 extending across the front of the vehicle and conforming to the general airfoil section thereof. In this embodiment, lines of electrodes are provided extending across the top wall 223 which provide the required sustentation and propulsion forces. In addition, electrode excitation systems are provided on the side walls as indicated on the wall 222, these excitation areas may be energized to assist the forward movement of the craft by the reactive force produced therein; the principal use of these side electrode systems, however, is to effect direct sideways movement of the craft by selective excitation of areas on the two sides to facilitate maneuvering.

The propulsion and sustentation system of this invention is particularly suited to the powering of aircraft similar in shape to the popular conception of the "flying saucer," and several forms of the flying saucer type of vehicle are illustrated in FIGS. 49 through 55; all of these embodiments of the invention are capable of flying directly upwardly through the atmosphere or horizontally and of hovering.

In the first of these saucer-type vehicle arrangements as shown in FIGS. 49 and 50 the electrode areas have been shown divided into eight generally pie-shaped sections 228 and all of the electrodes are in the form of comb-like segments or rings 229 the rows of points extending along concentric circles and forming the pie-shaped sections. All of the electrodes have these discharge points but only those on the lower half of FIG. 49 have been illustrated. The upper inverted bowl or saucer-shaped portion of the housing is provided with a central airguide or cone 230 which directs the air from above the vehicle onto the pie-shaped sections of the saucer airfoil. The electrodes are pointed downwardly over each section so that the flow of fluid is produced from the center outwardly and downwardly over the inverted bowl-shaped form to the periphery of the vehicle. It will thus be apparent that in addition to the Bernoulli pressure reduction lifting effect produced by operation of the electrodes to produce fluid flow, there is an additional reactive force tending to push the craft upwardly in view of the downward direction of the electrode points; thus the reactive forces produced in the acceleration and propulsion of charged particles are effective to supplement the lifting forces produced by the pressure differences. The lower saucer-shaped portion of the body is also provided with similar electrodes indicated at 231 which may be employed for maneuvering purposes and also for effecting a rapid descent when desired. The electrodes in this section are also arranged to produce a flow of fluid from the center of the wall outwardly toward the perimeter. The various sections of the electrode system may be operated by the selective controls indicated above so that, for example, lateral movement of the aircraft may be produced by energizing only one of two oppositely directed sets of electrodes. Also reversible electrodes such as those illustrated in FIGS. 39 through 44 together with reversible connection of the excitation system may be used on selected pie-shaped sections to facilitate the high speed horizontal movement of the craft.

For purposes of landing and of moving the vehicle about the ground a tricycle landing gear comprising three caster-type wheels 232 is employed. Conventional arrangement for retracting the landing gear may be provided. An aircraft of this type may easily be maneuvered and requires a minimum of tipping to secure various degrees of forwardly sloping surface. It will be noted that the faces of the upper and lower shells provide components of force in the horizontal plane and facilitate the directional control of the vehicle without requiring it to be tipped or banked in the direction in which it is desired to move. By operation of the control to select the individual electrode areas to be energized, the vehicle can be moved forward, back, right, left, up or down without turning, banking or otherwise changing the vehicle's orientation. However, a conventional banked turn can also be executed if desired. A vehicle of this type when made water tight may be operated both in the air and under water. It will be understood that the electric potentials required for ionization and operation of the system to produce fluid flow in water are different from those for air in view of the different characteristics of the two fluids. However, the overall control of the system and the manner in which the vehicle is maneuvered remain the same.

In the embodiment of FIGS. 51 and 52 the vehicle body is similar in form to that of FIGS. 49 and 50 but is constructed with a central opening indicated at 236 extending entirely through the body which is thus of doughnut or somewhat toroidal form; the outer circumferential portion is of essentially the same cross section as that of the embodiment shown in FIGS. 49 and 50. In this embodiment the arrangement of the electrode elements is generally the same as that shown in FIG. 49, the electrode elements being located in eight sectionalized portions of the surface area on both the upper and lower walls. The electrode points in this case have been illustrated as arranged oppositely from those in FIG. 49 as indicated by the electrodes on the left-hand portion of the plan view FIG. 1; as indicated at 237 the points of the electrodes extend toward the center so that the fluid flow is from the periphery up over the curved wall and thence down through the opening 236. The downward flow of fluid through the opening produces a thrust which supplements the lift on the upper shell and increases the sustentation effect. In a similar manner increased downward force may be provided by excitation of the bottom wall electrodes. The vehicle is provided with a landing gear similar to that of FIG. 50 as shown at 238 in FIG. 52. Access to the vehicle may be had through a suitable door or hatch (not shown).

In FIGS. 53, 54 and 55 there is illustrated an embodiment of the invention which is particularly adapted for horizontal flying and hovering and which includes an arrangement for moving certain sections of the airfoil surfaces to secure more effective use of the available forces. As shown in FIGS. 53 and 54 the body of the vehicle is somewhat similar to that of FIGS. 51 and 52 and comprises a somewhat toroidal hollow body having electrode assemblies arranged on the outer surface and sectionalized in eight equal generally pie-shaped portions, extending around the upwardly convex wall as indicated at 240. The central opening through the toroidal body as indicated at 241 is provided with a top closure plate or disc 242 and a secondary rectangular closure plate or member 243 which is arranged centrally of the disc 242 and extends along the axis parallel to the vertical diameter of the disc 242 as viewed in FIG. 53. The electrode areas have been shown arranged for horizontal flight from left to right as viewed in FIG. 53; for this purpose the electrodes on the left-hand pie-shaped excitation areas 244, 245 and 246 and those on the right-hand areas 247, 248 and 249 are arranged to produce a flow of fluid in the same direction, in other words in FIG. 3 from right to left, and the electrodes on the disc 242 and the rectangle 243 are also arranged to be excited to produce a flow from right to left. The fluid flow is radial in all of the pie-shaped areas and, therefore, the flow over the areas, particularly 244, 246, 247 and 249, is not truly parallel to the direction of horizontal flight; however, the lateral components cancel out because the patterns are symmetrical with respect to the line of flight. This is a flow condition for horizontal flight and the remaining pie-shaped electrode areas 250 and 251 on the vertical axis as viewed in FIG. 53 are not energized. This vehicle and electrode area arrangement makes possible a wide range of control by sectionalizing the various electrode areas. In order to secure maximum flexibility of control all of the electrodes preferably are made of the reversible type such as illustrated in FIGS. 39 through 44. It will now be seen that the direction of flight of the aircraft may be reversed so that it moves from left to right instead of right to left, the excitation system being reversed to make all of the electrodes in the excited areas produce flow in the opposite directions from those indicated in FIG. 53. Furthermore, by making the electrodes on the areas 250 and 251 also reversible these areas may be used with the areas 244 and 247 and 246 and 249 to propel the craft at right angles to the directions indicated on the figure. Obviously, also, any selection of sets of three areas on opposite sides of the aircraft may be employed to effect movement in any of the eight possible directions. It will be understood, however, that with the arrangement shown the central exciting area on the discs 242 and 243 is employed only when the direction of movement is from right to left or vice versa as viewed in FIG. 53, this being the intended normal direction of horizontal travel of the aircraft and providing the most effective use of the propulsion system. The vehicle FIGS. 53 and 54 may also be moved vertically by energizing the several pie-shaped areas in the same direction either inwardly or outwardly or in opposite pairs inwardly or outwardly so that the forces are symmetrical. The electrode systems of surface portions 242 and 243 may be either energized or de-energized for the operation depending upon the amount of lift required.

In order to secure more effective hovering operation, the central passage 241 is opened and the closure members 242 and 243 raised and opened; and in addition a bottom closure, as indicated at 251, is lowered so that the central passage is completely open and two separate passages are provided through the center, one an annular passage formed between the member 242 and the body of the ship, and the other a central passage formed between the member 243 and the member 242. For hovering purposes the electrodes on all of the body surface, including all eight pie-shaped areas for full effect, are controlled to direct the fluid flow inwardly toward the center; and the electrodes on the closure portion 242 are also reversed on one-half the portion so that there is a balanced flow inwardly toward the opening between the member 243 and the closure 242. The passage of the air through these openings is indicated by the arrows in FIG. 55 which shows the open or hovering position of the airship.

The lower wall areas of the vehicle shown in FIGS. 53, 54 and 55 may also be provided with electrode excitation zones in a manner similar to that shown in connection with the other saucer-like vehicles described above, and these zones may be employed for executing rapid descent and also for directional control purposes. The electrode areas may be further sectionalized so that rearwardly facing areas may be de-energized so that areas with the forward component of lift may be used for propelling the ship.

Figure 56:
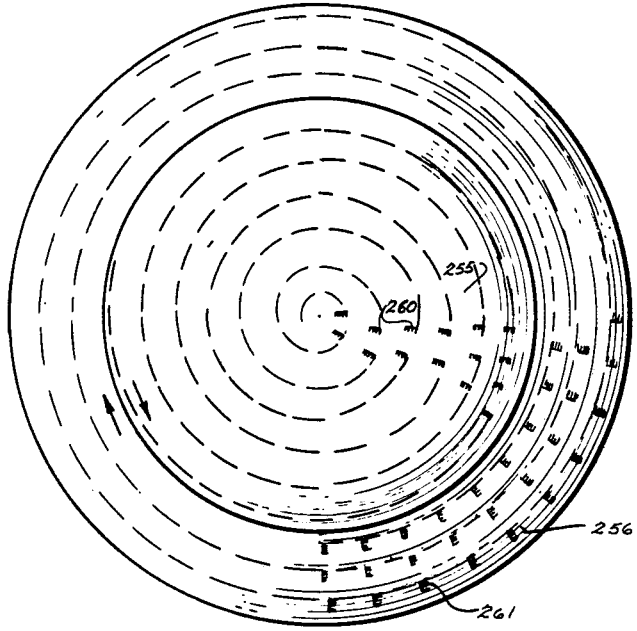
FIGS. 56 and 57 are plan and elevation views of another aircraft illustrating a further embodiment of the invention.
Figure 57:
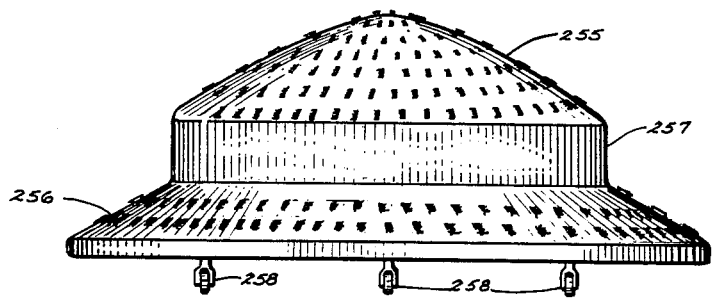

The vehicle shown in FIGS. 56 and 57 is similar to that shown in FIGS. 50 and 51 and includes the counter-rotational feature of the lifting body shown in FIG. 47. The vehicle shown in FIG. 56 comprises a central dome-shaped body portion 255 and a lower similarly sloping rim portion 256, the two portions being connected by the main cylindrical wall of the vehicle at 257. This vehicle includes a landing gear having three caster-type wheels 258. The dome-shaped wall of the body section 255 is provided with a spiral line of electrodes extending from the center outwardly to the rim thereof; as illustrated in the detail view FIG. 58, a plurality of electrodes 260, each comprising a short strip 260a having a multiplicity of teeth or needles 260b, are held in spaced relationship to the vehicle wall on upright conducting lugs 259. The electrodes are arranged around the spiral path so that the direction of the spiral path is from the center outwardly so that the reaction force produced by the propulsion of charged particles tends to turn the vehicle body counterclockwise as viewed in FIG. 56. In order to counteract this rotational effect the field of electrodes on the lower wall portion 256 is constructed as a spiral of electrodes 261 similar to the electrodes 260 but pointing in the opposite direction and arranged to drive the air in a spiral path about the vehicle in a counterclockwise direction. The reactive force on this path tends to turn the vehicle body clockwise and counteract the force of reaction produced by the electrodes 260 on the body section 255. The corresponding directions of rotation which tend to be produced by the two sections of the excitation field are indicated by the arrows.

Figures 58, 59:
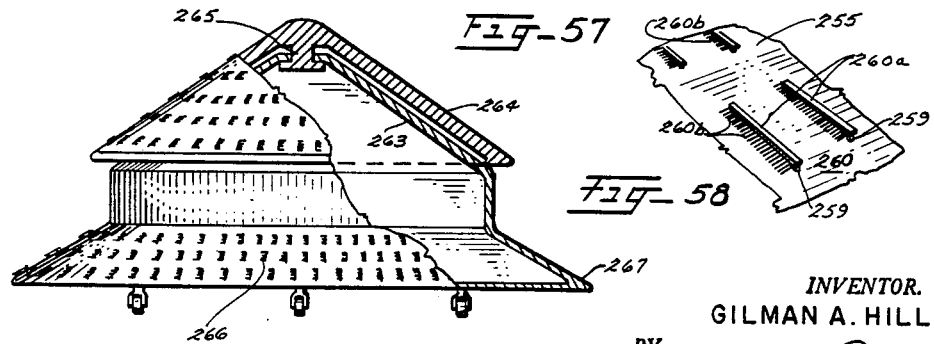
FIG. 58 is an enlarged detail view of several of the electrodes employed in the embodiment of FIGS. 56 and 57.
FIG. 59 is an elevation view, partly in section, illustrating an aircraft embodying a further modification of the invention.

The vehicle shown in FIG. 59 is essentially similar to that shown in FIGS. 56 and 57 and presents the same general appearance. The upper section, however, is constructed differently, the upper wall of the body being a cone-shaped member 263 and the upper electrode surfaces being provided on a complementary cone-shaped member 264; this member is pivotally mounted on the body on a bearing 265 at the top and concentric with the central axis of the body. The bearing allows the electrodes on the element 264 to rotate that element without imparting very much rotary torque to the body of the vehicle. In this manner minimum torque is transmitted to the body. Any driving torque on the body may be counteracted by energization of the sets of electrodes indicated at 266 on the lower skirt portion 267 of the vehicle. The lower electrodes 266 are preferably arranged in sections so they may be controlled selectively. These electrodes, as illustrated are closed circles and each circle may be energized separately so that the number of circles and the forces applied may be selectively determined.

The systems for propelling aircraft or similar vehicles through fluid media as disclosed herein provide an effective arrangement for propelling space vehicles into the upper atmosphere so that a major portion of the fuel load of a rocket driven ship, for example, may be retained until the ship is prepared to leave the earth's atmosphere and so that the ship need not apply rocket power to drive the vehicle through the regions of denser atmosphere. FIGS. 60 and 61 illustrate a generally conventional form of rocket vehicle comprising a main cylindrical body 270 having a bullet-shaped nose 271 and four tail fins 272 at the rear. The surface area of the body is divided longitudinally into eight sections four of which are visible at 273, 274, 275 and 276 in FIG. 60 and the other four of which are indicated in the end view FIG. 61 at 277, 278, 279 and 280. An engine driven generator 281 is provided in the body of the vehicle for supplying the electrode excitation. These eight surface areas are provided with electrode systems embodying the invention and in this case comprising short sections of rings about the body and these sections may therefore be controlled so that the craft may be maneuvered and driven through the atmosphere in a manner similar to the other vehicles described above and may be driven into the upper rarefied atmosphere. When it reaches the rarefied atmosphere this vehicle may be propelled into space by operation of a conventional rocket engine mounted within the vehicle and having a discharge nozzle 281 at the rear end thereof. In addition to the main rocket engine the craft is provided with the usual control rockets (not shown) for effecting changes in the direction of movement of the vehicle.

FIGS. 62 and 63 illustrate a vehicle suitable for flight through the atmosphere and in outer space and which is similar to the vehicle of FIG. 60 but employs a different propulsion system for movement in outer space. In this vehicle the body portion is of generally square cross section and comprises a main body 285, a generally bullet-shaped nose 286 and a tail member having guide or stabilizing fins 287. The generally flat areas of the outer surface of the body 285 are provided with electrodes of excitation systems embodying the invention and thus there are four such electrodes systems as indicated at 288, 289, 290 and 291. These areas may be further sectionalized for control purposes if desirable. In addition to the electrode surfaces on the body portion of this rocket (FIG. 62) and also on the rocket FIG. 60, the tail fins may be provided with electrode excitation systems for both sides so that the electrical excitation may be employed for guiding purposes.

The vehicle of FIG. 62 is provided with four longitudinally extending relatively large tubes 292, 293, 294 and 295 arranged generally along the four corners of the rectangular section of the aircraft. These tubes are open at their rear ends and extend a substantial distance into the ship as indicated in the broken away section toward the center where the tubes 292, 293 and 294 are visible. The inner walls of these tubes are provided with annular or ring sets of electrodes indicated at 296 in the tube 293 and also visible at the ends of the tubes and in the sectional view of FIG. 63 where it may be seen that all four tubes are provided with similar electrode assemblies. The electrodes in the tubes 292 through 295 are in the same general form as those heretofore described and are provided with needle points all directed rearwardly toward the open ends of the tubes. The forward ends of the tubes are arranged to be supplied with charged particles through respective pipes from a supply source as indicated at 298 in the broken portion of the wall 289 toward the forward end of the ship. The supply 298 is connected by four pipes to the respective four tubes and supplies electrically charged fine dust, ionized gases or other charged particles to the ends of the electrodes; when the electrode assemblies are energized these particles are driven forcibly at high velocity out of the tubes. The electrode assemblies on the inner walls of the tubes may not be energized until the craft reaches the rarefied atmosphere or until a burst of speed is desired, whereupon they are energized so that the reactive force urges the ship forward at a velocity determined by the momentum of charged particles which are discharged through the tubes. In order to attain the velocities required to escape from the earth's gravitational field the craft in FIG. 63 may be directed in a generally circular or spiral path about the earth until it builds up sufficient speed to escape from the earth's field. The excitation of the external electrodes may be stopped when the craft is beyond the limits of the atmosphere.

The use of the sustentation and propulsion system of this invention to carry rockets and space craft to the limits of a planet's atmosphere results in the saving of rocket fuel, making it possible to carry larger payloads or to conserve the conventional rocket fuel for propulsion through space and for control and maneuvering in space. The electric rocket propulsion system described in connection with FIG. 63 can be used for propulsion and maneuvering in space in place of conventional rocket fuels.

When the sustentation and propulsion system of this invention is used to propel a device through the atmosphere toward outer space, the type of discharge from the electrode elements will be governed by such variables as the applied voltage, frequency, wave form, pressure, temperature, impedance of the power supply and electrode spacing. For example, if these parameters are set for a low current discharge at one altitude then as the vehicle enters less dense air at higher elevations the low current discharge will tend to increase in intensity and gradually become a glow type discharge. Under still other conditions an arc-type discharge will take place. When the impedance of the power supply or other parameters are varied, the intensity of the discharge can be altered to produce various concentrations of ions and various physical appearances of the discharge ranging from the conventional corona, to glow, to arc, or spark types. All of these discharges will be useful in moving ambient fluids.

When any type of discharge takes place from a pointed electrode, a preponderance of ions of the same charge as the electrode are produced. Because of the very high potential gradient in the vicinity of sharp points, any charged particles whose charge is opposite to that of the electrode, will be very strongly attracted to the electrode and where they are captured and neutralized. If some ion pairs are produced far from the sharp-pointed electrode by any means such as collisions, the ion whose charge is different from that of the rest of the pulse will be quickly neutralized by recombining with the oppositely charged ions in the pulse and therefore will not appreciably affect the net flow of the fluid.

The fluid flow systems of this invention may be employed for various purposes wherein it is desirable to provide a laminar flow of fluid adjacent the surface, and as an example of such application there is shown in FIG. 64 a portion of a wind tunnel system comprising an inlet portion 300 and an outlet portion 301 connected by a constricted portion or throat 302. The gradually reducing cross sectional area of the inlet portion 300 is provided to effect an increase in velocity of flow as the air reaches the throat portion and the discharge portion 301 restores the air to its former pressures and speeds. The section of the wind tunnel shown may be connected in the usual recirculating air system employed for wind tunnel work.

The internal walls of the wind tunnel are provided with ring electrodes embodying the invention. These electrodes are arranged as shown in groups with increasing spacing in each group in the portion 300 toward the throat and decreasing spacing in each group in the portion 301 on the discharge side of the throat. Two groups of electrodes are shown at 303 and 304 in the inlet end of the tunnel and two additional sets 305 and 306 are visible in the cut-away portion. The latter portions 305 and 306 show the progressive change in spacing of each group of electrodes with the changes in the throat cross sectional area. FIG. 65 is an enlarged sectional view of a portion of the throat along the line 65—65 of FIG. 64 showing a set of electrodes 307 and a portion of the set 305. It will be noted that the electrodes are of the same general type as those indicated in the modification of the invention shown in FIG. 4 except that the length of the electrodes in the direction of fluid flow and their spacing is varied along the wall in the direction of fluid flow. The spacing of the electrode elements of each group is increased as the section of the wind tunnel decreases; after passing the throat the spacing decreases as the tunnel cross sectional area increases. The several sections of the electrode excitation system in the wind tunnel may be separately excited and connected to different frequency alternating current systems so that the resonant velocity of the fluids passing over the electrodes may be increased over the throat of the tunnel and decreased thereafter. Thus the rate of flow of the fluids along the inner walls of the tunnel may be controlled by changing the frequency of the alternating potential impressed on one group with respect to that of the next. In order to maintain the flow through the wind tunnel at the desired high velocities and at the same time with minimum turbulence, the rate of flow of the fluid is varied generally in inverse proportion to the cross sectional area; for an application such as that illustrated, the rate of flow is controlled so that the product of the cross sectional area and the velocity of the fluid is substantially constant at all points along the wind tunnel. In some applications it is found advantageous to progressively decrease the product of the flow velocity times the cross sectional area along the flow path through the wind tunnel. By proper adjustment of this system the fluid such as air may be caused to flow at high velocity through the throat of the tunnel with minimum turbulence.

The term "charged particles" as used herein has reference to any particles regardless of size which are attracted or repelled by an electric charge and are influenced by and may be moved by electric fields; thus the term has reference to ions in gases and liquids regardless of how they exist or are produced, to charged particles of solid or liquid matter such as dust and water droplets, to colloidal electrolytes, to polarized particles such as water molecules, and many non-symmetrical polar organic molecules and to many other particles possessing these electrical propulsion properties.

The term "surface layer fluid flow" as used herein designates a flow of fluid in a layer or stratum adjacent, near or in contact with a surface.

The term "progressively changing potential" as used herein has reference to electric potentials in an electric field which change at each point with respect to adjacent points in the direction of the field in a manner such that, with respect to a charged particle moving in the field, either an essentially neutral potential or an attracting potential is maintained ahead of the particle. The term thus has reference to both direct current fields of increasing attracting potential and to alternating fields which produce true traveling waves and to other periodically varied fields which produce a traveling wave effect.

The term "corona discharge" as used herein has reference to the whole class of discharges requiring a voltage to produce or maintain ionization. Such discharges include corona, glow, arc and spark discharges.

The methods of producing fluid flow and the sustentation and propulsion methods of this invention may be employed in a wide range of applications; for example, they may be employed for various gaseous and liquid fluid handling systems and also for the propulsion and sustentation of a wide variety of self-propelled vehicles and other bodies. The vehicles such as aircraft and submarines may hover in one position for long periods or may move in any desired direction at low or high speeds.

Although this invention has been described in connection with its application to specific fluid flow systems and self-propelled vehicles, various other applications and embodiments will occur to those skilled in the art. Therefore, it is not desired that the invention be limited to the modifications illustrated and described and it is intended by the appended claims to cover all modifications which fall within the spirit and scope of the invention.

I claim:
1. A fluid moving system for producing substantially laminar flow of ambient fluid over and adjacent a substantially smooth surface exposed to the fluid which comprises a multiplicity of electrode elements mounted in spaced relationship to one another adjacent said surface and electrically insulated from one another and constituting a series of elements extending along a portion of the surface, means comprising a multiplicity of sharp points on predetermined ones of said elements oriented in the direction of flow of fluid over said elements for producing charged particles adjacent said predetermined ones of said elements, all of said sharp points for each of said elements lying substantially in a plane perpendicular to the direction of fluid flow and equidistant from the next element in the direction of flow whereby the production of charged particles by a corona-type discharge is facilitated at each of said sharp points, electric exciting means connected with said electrode elements for producing progressively changing electric potentials along said surface thereby creating an electric potential field for propelling charged particles dispersed in the ambient fluid progressively from one electrode element toward the next and inducing a surface layer fluid flow over said portion of the surface, certain of said predetermined elements comprising conducting bars having said sharp points arranged in two sets pointing in opposite directions, auxiliary electrodes spaced from said bars one on one side and one on the other of each of said bars, and switching means for selectively connecting each of said bars alternatively to the auxiliary electrode on either side thereof for reversing the direction of corona discharge and the direction of charged particle propulsion.

2. A fluid moving system for producing substantially laminar flow of ambient fluid over and adjacent a substantially smooth surface exposed to the fluid which comprises a multiplicity of electrode elements mounted in spaced relationship to one another adjacent said surface and electrically insulated from one another and constituting a series of elements extending along a portion of the surface, and electric exciting means connected with said electrode elements for producing progressively changing electric potentials along said surface thereby creating an electric potential field for propelling charged particles dispersed in the ambient fluid progressively from one electrode element toward the next and inducing a surface layer fluid flow over said portion of the surface, said exciting means comprising an alternating voltage source connected to excite said electrode elements successively to electric potentials at predetermined phase differences between adjacent electrodes for producing a traveling wave effect and for propelling charged particles dispersed in the fluid medium progressively along the surface at a resonant velocity which is substantially the velocity of the traveling wave effect and is dependent upon the frequency of the alternating voltage and the phase relationship between the potentials applied to adjacent electrodes and the spacing between electrode elements, said exciting means further including means for generating a first alternating voltage having an essentially square wave form and means for applying said first alternating voltage between every other odd-numbered electrode element in a series and means for generating a second alternating voltage having the same wave form voltage and frequency as said first alternating voltage but with its phase lagging approximately ninety degrees behind said first alternating voltage and means for applying said second alternating voltage between every other even-numbered electrode element in a series.

3. A fluid moving system as set forth in claim 2 wherein said means for generating said first and second alternating voltages comprises direct current sources of opposite polarity and switching means for applying periodic bursts of said voltages which thus constitute voltages of alternating square wave form.

4. A fluid moving system as set forth in claim 3 including means dependent upon the opening of said switching means for forming a short high-voltage pulse and impressing said pulse on the square wave voltages at predetermined points thereon.

5. A fluid moving system for producing substantially laminar flow of ambient fluid over and adjacent a substantially smooth surface exposed to the fluid which comprises a multiplicity of electrode elements mounted in spaced relationship to one another adjacent said surface and electrically insulated from one another and constituting a series of elements extending along a portion of the surface, and electric exciting means connected with said electrode elements for producing progressively changing electric potentials along said surface thereby creating an electric potential field for propelling charged particles dispersed in the ambient fluid progressively from one electrode element toward the next and inducing a surface layer fluid flow over said portion of the surface, said exciting means comprising an alternating voltage source connected to excite said electrode elements successively to electric potentials at predetermined phase differences between adjacent electrodes for producing a traveling wave effect and for propelling charged particles dispersed in the fluid medium progressively along the surface at a resonant velocity which is substantially the velocity of the traveling wave effect and is dependent upon the frequency of the alternating voltage and the phase relationship between the potentials applied to adjacent eelctrodes and the spacing between electrode elements, said system further including means for generating an alternating voltage having an essentially flat top wave form over a substantial portion of each half cycle and having a nearly zero voltage for an appreciable period between flat top portions, and means for superposing at a predetermined time on the flat top portion of each half cycle a high-voltage pulse of the same polarity as the flat top wave on which it is superposed.

6. A fluid moving system as set forth in claim 5 including means for adjusting the time of the high-voltage pulse with respect to the flat top wave form.

7. A fluid moving system as set forth in claim 5 including means for separately adjusting the voltage of the short pulse to control the production of charged particles in the ambient fluid.

8. A fluid moving system as set forth in claim 5 including means for separately adjusting the voltage of the essentially flat top portion to control the velocity of the charged particles and thereby synchronize their movement with the velocity of the traveling wave effect.

9. A fluid moving system as set forth in claim 5 including means for adjusting the length of the essentially flat top portion of each half cycle compared to the length of the nearly zero voltage portion, thereby affording an increase in efficiency by minimizing the capture of charged particles by electrodes and minimizing reversed propulsion of charged particles which get out of synchronization with the traveling wave effect.

10. A fluid moving system for producing substantially laminar flow of ambient fluid over and adjacent a substantially smooth surface exposed to the fluid which comprises a multiplicity of electrode elements mounted in spaced relationship to one another adjacent said surface and electrically insulated from one another and constituting a series of elements extending along a portion of the surface, and electric exciting means connected with said electrode elements for producing progressively changing electric potentials along said surface thereby creating an electric potential field for propelling charged particles dispersed in the ambient fluid progressively from one electrode element toward the next and inducing a surface layer fluid flow over said portion of the surface, said exciting means comprising an alternating voltage source connected to excite said electrode elements successively to electric potentials at predetermined phase differences between adjacent electrodes for producing a traveling wave effect and for propelling charged particles dispersed in the fluid medium progressively along the surface at a resonant velocity which is substantially the velocity of the traveling wave effect and is dependent upon the frequency of the alternating voltage and the phase relationship between the potentials applied to adjacent electrodes and the spacing between electrode elements, said alternating voltage source comprising a multiphase alternating voltage generator and wherein each successive electrode in the direction of fluid flow and connected to said source is excited at a voltage lagging the preceding excited electrode by a predetermined phase difference whereby excitation of said electrodes produces a true traveling wave having a velocity dependent upon the frequency of the source and the minimum distance between electrodes of the same phase relationship.

11. A fluid moving system as set forth in claim 10 including means arranged to change the minimum distance between excited electrodes of the same phase relationship for changing the velocity of the traveling wave.

12. A fluid moving system as set forth in claim 10 including means arranged to change the frequency of the alternating potential for changing the velocity of the traveling wave.

13. A vehicle for movement through an ambient fluid medium comprising a hollow ring-shaped body having walls of bluntly rounded cross-section about the central opening thereof and of tapering cross-section toward the outer periphery of the ring, the upper wall of said ring presenting a smooth surface, and means including a plurality of spaced electrode elements insulated from one another and mounted adjacent said smooth upper wall and an electric excitation system therefor for producing electric winds at high velocities in generally radial paths from the periphery of the ring inwardly over said surface and downwardly through the central opening of the ring, the winds passing downwardly through the central opening producing an upward thrust against the electrode elements about the central opening and the high wind velocity reducing the fluid pressure on the surface for facilitating the sustentation of said vehicle.

14. A vehicle as set forth in claim 13 wherein said electrode elements are in the form of segments of concentric circles of increasing length outwardly and are arranged to form a plurality of series of elements of a pie-shaped section.

15. A vehicle as set forth in claim 14 including means for controlling the energization of the electrode elements of each of said series of elements independently from those of the other series to facilitate the propulsion and guiding of said vehicle.

16. A vehicle for movement through an ambient fluid medium comprising a hollow body of general disc-like configuration and having a substantially smooth upper surface, and means including a plurality of series of spaced electrode elements insulated from one another and mounted adjacent the smooth upper surface of said body and an electric excitation system therefor for producing electric winds at high velocities across each of said series of electrodes along said surface, said wind producing means including a source of charged particles in massed volumes having high electrical charge density for supplying particles adjacent said surface, said series of electrodes being oriented to produce electric winds along paths substantially parallel to a diameter of said body from one edge to the opposite edge thereof whereby the reactive force produced against said electrodes is effective to urge said body in the opposite direction from that of the electric winds, said body including a hollow portion of ring-like configuration and a movable closure member for covering the central opening of the ring, electrode elements on said closure member, means for exciting the electrode elements on said member to produce an electric wind concurrently and in the same direction as the winds produced by said first-mentioned elements, means for moving said closure member outwardly to expose the central opening, and means for reversing the direction of flow of fluid produced by at least one of said series of electrode elements arranged to produce a flow outwardly from the center whereby a flow of fluid from the periphery inwardly toward the center and downwardly through said central opening is produced to facilitate sustentation of said vehicle.

References Cited in the file of this patent

UNITED STATES PATENTS

| | | |
|---|---|---|
| 1,980,521 | Hahn | Nov. 13, 1934 |
| 2,279,586 | Bennett | Apr. 14, 1942 |
| 2,556,978 | Pierce | June 12, 1951 |
| 2,623,465 | Jasse | Dec. 30, 1952 |
| 2,624,281 | McNally | Jan. 6, 1953 |
| 2,645,279 | Rossmann | July 14, 1953 |
| 2,718,364 | Crabtree | Sept. 20, 1955 |
| 2,765,975 | Lindenblad | Oct. 9, 1956 |
| 2,925,214 | Gurewitsch | Feb. 16, 1960 |
| 2,927,746 | Mellen | Mar. 8, 1960 |
| 2,946,541 | Boyd | July 26, 1960 |

FOREIGN PATENTS

| | | |
|---|---|---|
| 1,031,925 | France | Mar. 25, 1953 |

OTHER REFERENCES

Review of Scientific Instruments; Ionic Pump; vol. 25, No. 4; April 1954; pp. 389 and 390.

Rocket Propellants; by Francis A. Warren; Reinhold Publishing Company; 1958; (pp. 209 and 211 required).

Astronautics; Cesium-ion Propulsion; vol. 4, No. 10; October 1959; pp. 34, 35, 92, 94, 96 and 97.

ARS Journal; New Ion Source for Propulsion of Space Vehicles; vol. 29, No. 11; November 1959 (reference to article of 1956); pp. 868–869.